United States Patent
Miyake et al.

(10) Patent No.: US 9,931,009 B2
(45) Date of Patent: Apr. 3, 2018

(54) AUTONOMOUS-TRAVEL CLEANING ROBOT

(71) Applicant: MIRAIKIKAI, INC., Kurashiki-shi, Okayama (JP)

(72) Inventors: Tohru Miyake, Takamatsu (JP); Hideto Matsuuchi, Takamatsu (JP); Kazuo Morita, Takamatsu (JP)

(73) Assignee: MIRAIKIKAI, INC., Kurashiki-shi, Okayama (JP)

(*) Notice: Subject to any disclaimer, the term of this patent is extended or adjusted under 35 U.S.C. 154(b) by 0 days.

(21) Appl. No.: 14/431,253

(22) PCT Filed: Dec. 25, 2013

(86) PCT No.: PCT/JP2013/007564
§ 371 (c)(1),
(2) Date: Mar. 25, 2015

(87) PCT Pub. No.: WO2014/103293
PCT Pub. Date: Jul. 3, 2014

(65) Prior Publication Data
US 2015/0272413 A1     Oct. 1, 2015

(30) Foreign Application Priority Data

Dec. 25, 2012  (JP) .................. 2012-281078

(51) Int. Cl.
*A47L 11/38*     (2006.01)
*A47L 9/28*      (2006.01)
(Continued)

(52) U.S. Cl.
CPC ............. *A47L 11/38* (2013.01); *A47L 9/2826* (2013.01); *F24J 2/461* (2013.01); *H02S 40/10* (2014.12); *A47L 2201/04* (2013.01); *Y02E 10/40* (2013.01)

(58) Field of Classification Search
CPC .. A47L 11/24; A47L 11/4041; A47L 2201/06; A47L 7/02; A47L 9/0477
(Continued)

(56) References Cited

U.S. PATENT DOCUMENTS 7,389,156 B2 *  6/2008  Ziegler ............. A22C 17/0013
                                                       318/568.1
7,441,298 B2 * 10/2008  Svendsen .................. A47L 5/30
                                                          15/319

(Continued)

FOREIGN PATENT DOCUMENTS

EP    2366964 A1    9/2011
JP    2002273351 A  9/2002
(Continued)

OTHER PUBLICATIONS

International Search Report of PCT/JP2013/007564 filed on Dec. 25, 2013.
(Continued)

*Primary Examiner* — McDieunel Marc
(74) *Attorney, Agent, or Firm* — Muncy, Geissler, Olds & Lowe, P.C.

(57) ABSTRACT

Provided is a self-propelled cleaning robot that can efficiently clean a flat surface even if a step is formed. The self-propelled cleaning robot that self-travels on a structure to clean a flat surface of the structure, the structure being installed in an outdoor location, the robot includes: a robot main body (2) in which a self-propelled moving mechanism (4) is provided; a cleaning unit (10) that is provided in a front portion and/or a rear portion of the robot main body (2); and a controller (30) that controls activation of the moving mechanism (4). At this point, the controller (30) includes an attitude controller (35) that detects an attitude of the robot main body (2), the attitude controller (35) includes a floating detection sensor (36) that detects floating in one of the front (Continued)

portion and the rear portion of the robot main body (2), and, when the floating detection sensor (36) detects the floating in one of the front portion and the rear portion of the robot main body (2), the controller (30) controls the activation of the moving mechanism (4) such that the cleaning unit (10) passes through a place where the floating is detected after the floating is eliminated.

19 Claims, 12 Drawing Sheets

(51) Int. Cl.
  *H02S 40/10* (2014.01)
  *F24J 2/46* (2006.01)
(58) Field of Classification Search
  USPC ............ 700/245, 258; 701/23; 15/319, 383, 15/384; 318/568.1; 136/244
  See application file for complete search history.

(56) References Cited

U.S. PATENT DOCUMENTS

| | | | | |
|---|---|---|---|---|
| 7,620,476 B2 * | 11/2009 | Morse | ................. | A47L 5/14 15/319 |
| 8,417,383 B2 * | 4/2013 | Ozick | ................. | G05D 1/0231 700/245 |
| 2005/0055792 A1 * | 3/2005 | Kisela | ................. | A47L 5/36 15/319 |
| 2008/0077278 A1 | 3/2008 | Park et al. | | |
| 2009/0271940 A1 * | 11/2009 | Lee | ................. | A47L 9/009 15/319 |
| 2010/0307559 A1 * | 12/2010 | Yamazaki | ............. | H01L 31/048 136/244 |
| 2011/0020139 A1 * | 1/2011 | Pichon | ................. | E04H 4/1654 417/46 |
| 2011/0054686 A1 | 3/2011 | Lee et al. | | |
| 2011/0197932 A1 * | 8/2011 | Mastio | ................. | E04H 4/1654 134/110 |
| 2015/0229265 A1 * | 8/2015 | Morita | ................. | A47L 11/24 701/23 |
| 2015/0236640 A1 * | 8/2015 | Miyake | ................. | F24J 2/461 15/383 |

FOREIGN PATENT DOCUMENTS

| | | |
|---|---|---|
| JP | 2004166968 A | 6/2004 |
| JP | 2009050294 A | 3/2009 |

OTHER PUBLICATIONS

European search report of the corresponding EP application No. 13868191.1 dated Apr. 26, 2016.

* cited by examiner (A)

(B)

AUTONOMOUS-TRAVEL CLEANING ROBOT

CROSS REFERENCE TO RELATED APPLICATIONS

This application is a national stage of International Application No.: PCT/JP2013/007564, which was filed on Dec. 25, 2013, and which claims priority to JP 2012-281078 which was filed on Dec. 25, 2012, and which are both herein incorporated by reference.

The present invention relates to a self-propelled cleaning robot. More particularly, the present invention relates to a self-propelled cleaning robot that cleans a surface of a solar cell array used in solar power generation and a surface of a condensing mirror used in solar thermal power generation.

BACKGROUND ART

Nowadays, a demand for power generation using renewable energy increases, and particularly solar power generation or solar thermal power generation using sunlight attracts attention.

For example, a solar power generation facility ranges from a facility having a power generation capacity of about 3 kilowatts to about 4 kilowatts provided in a standard home to a commercial large-scale power generation facility having a power generation capacity exceeding 1 megawatt, and is expected as an alternative power generation facility for thermal power generation or nuclear power generation. Even in the solar thermal power generation facility, there are many large-scale facilities having the power generation capacity exceeding 1 megawatt, and the solar thermal power generation facility is also expected as the alternative power generation facility for thermal power generation or nuclear power generation.

The power is generated by receiving solar radiation light from the sun in power generation such as the solar power generation and the solar thermal power generation, in which sunlight is used. Therefore, when a light receiving surface of the solar cell array (that is, a solar cell module) or the condensing mirror gets dirty, in the solar power generation, light transmission of a cover glass constituting the light receiving surface of the solar cell module degrades according to a level of dirt to decrease a power generation amount. In the solar thermal power generation, a reflection rate of the condensing mirror degrades to decrease the power generation amount. That is, in the solar power generation or solar thermal power generation, when the light receiving surface of the solar cell module or condensing mirror gets dirty, power generation performance degrades largely. Therefore, it is necessary to properly clean the solar cell array and the like to remove dirt on the light receiving surface of the solar cell array and the like.

The facility provided in a standard home can periodically be cleaned by a person. On the other hand, because the large-scale solar power generation facility has a huge surface area, it is difficult for a person to clean to remove dirt on the surface of the solar cell array. For example, assuming that a 1-megawatt solar power generation facility is constructed with solar cell modules each of which has power generation output of 100 watts, 10000 solar cell modules are provided in the whole solar power generation facility. In the case that one solar cell module has a 1-square-meter area, the area to be cleaned becomes 10000 square meters. Plural solar cell arrays each of which has a set of plural solar cell modules are provided in the solar power generation facility, the area of solar cell array ranges from about 50 square meters to about 1000 square meters although it depends on various field conditions. Accordingly, in the large-scale solar power generation facility, it is necessary to introduce the autonomous-travel cleaning robot that can run on the solar cell array and the like in an automatic or remote control manner.

Nowadays, various autonomous-travel cleaning robots that automatically clean a floor of a building are developed, and the autonomous-travel cleaning robots that clean the floor are available in the market. It is conceivable that the autonomous-travel cleaning robot is used as the robot that cleans the solar cell array.

PRIOR ART DOCUMENT

Patent Document

Patent Document 1: JP-A-2004-166968

SUMMARY OF THE INVENTION

Problems to be Solved by the Invention

In the solar power generation facility or the like, because the solar cell array or the like is formed by arraying the plural solar cell modules or the like, it is necessary that the robot sequentially clean the solar cell modules or the like while moving between the solar cell modules or the like. However, sometimes a step is formed between adjacent solar cell modules or the like due to an irregularity of an installation site or a construction error.

The conventional autonomous-travel cleaning robot is designed on an assumption that the robot cleans a floor surface with little difference in level. Therefore, when the autonomous-travel cleaning robot moves across the step, a cleaning unit of the autonomous-travel cleaning robot floats from the solar cell module or the like, but robot cannot clean the surface of the solar cell module or the like during the floating of the cleaning unit.

In the case that not only the step but also a gap (several millimeters to several centimeters) exist between the solar cell modules (or the condensing mirrors), a robot body is inclined when coming to a position where a wheel is fitted in the gap, and sometimes an increase in a distance between brush and a surface to be cleaned makes the normal cleaning difficult to be performed.

That is, in the case that the conventional autonomous-travel cleaning robot cleans the solar cell array or the condensing mirror of the solar thermal power generation, the whole surface of the solar cell array or condensing mirror is hard to be cleaned, and a portion in which the cleaning is not performed is generated, which results in a risk of largely degrading power generation performance. Particularly, the solar cell module has a characteristic that only a dirty part of the surface has a large influence on output of the whole module. That is, there is a non-linear relationship between an area to which the dirt adheres and a degradation amount of power generation output. Accordingly, in cleaning the surface of the solar cell module, it is necessary that the whole surface of the solar cell be uniformly cleaned without forming a region where the cleaning is insufficiently performed. For example, the case that only a half area in the dirty solar cell module is cleaned is compared to the case that the whole dirty solar cell module is cleaned. In this case, in the case that only the half area in the dirty solar cell module is cleaned, the power generation output (the power generation performance recovered by the cleaning) increased by the cleaning does not become a half of the power generation output increased by cleaning the whole area, but an increase in power generation output falls much below the half of the power generation output increased by cleaning the whole area.

On the other hand, when the autonomous-travel cleaning robot cleans the identical place in a reciprocating manner at least once in consideration of the formation of the region where the cleaning is insufficiently performed, although the above problem is solved, a time necessary for cleaning work is lengthened, work efficiency degrades, and cost necessary for the cleaning work increases largely.

An object of the present invention is to provide an autonomous-travel cleaning robot that can efficiently clean the flat surface even if the step is formed.

Means for Solving the Problems

According to a first aspect of the present invention, an self-propelled cleaning robot that self-travels on a structure to clean a flat surface of the structure, the structure being installed in an outdoor location, the self-propelled cleaning robot includes: a robot main body in which a self-propelled moving means is provided; a cleaning unit that is provided in a front portion and/or a rear portion of the robot main body; and a controller that controls activation of the moving means. At this point, the controller includes an attitude controller that detects an attitude of the robot main body, the attitude controller includes a floating detection sensor that detects floating in one of the front portion and the rear portion of the robot main body, and, when the floating detection sensor detects the floating in one of the front portion and the rear portion of the robot main body, the controller controls the activation of the moving means such that the cleaning unit passes through a place where the floating is detected after the floating is eliminated.

According to a second aspect of the present invention, in the self-propelled cleaning robot of the first aspect, the floating detection sensor is an inclination sensor that detects an inclination of the robot main body.

According to a third aspect of the present invention, in the self-propelled cleaning robot of the first aspect, the cleaning unit includes a brush that is rotated by a motor, and the floating detection sensor is a motor monitoring sensor that detects an activation state of the motor.

According to a fourth aspect of the present invention, an self-propelled cleaning robot that self-travels on a structure to clean a flat surface of the structure, the structure being installed in an outdoor location where an inclination angle of the flat surface changes with respect to a horizontal direction, the self-propelled cleaning robot includes: a robot main body in which a moving means for a self-propelled moving means is provided; a cleaning unit that is provided in a front portion and/or a rear portion of the robot main body; and a controller that controls activation of the moving means. At this point, the controller activates the moving means such that the moving means travels on the flat surface when the inclination angle of the flat surface of the structure is less than a predetermined angle, and the controller activates the moving means such that the moving means stops the travel on the flat surface when the inclination angle of the flat surface of the structure is greater than or equal to the predetermined angle.

According to a fifth aspect of the present invention, in the self-propelled cleaning robot of the fourth aspect, in the case that the structure includes a base that holds the self-propelled cleaning robot, the controller activates the moving means such that the moving means moves from the flat surface to the base when the inclination angle of the flat surface of the structure is greater than or equal to the predetermined angle, and the controller activates the moving means such that the moving means moves from the base to travel on the flat surface when the inclination angle of the flat surface of the structure is less than the predetermined angle.

According to a sixth aspect of the present invention, in the self-propelled cleaning robot of the fourth aspect, the robot main body includes a fixing unit that fixes the robot main body to the structure, and the controller stops the travel on the flat surface to fix to the robot main body to the structure using the fixing unit when detecting that the inclination angle of the flat surface of the structure is greater than or equal to the predetermined angle, and the controller releases the robot main body fixed to the structure by the fixing unit to cause the robot main body to travel on the flat surface when detecting that the inclination angle of the flat surface of the structure is less than the predetermined angle.

According to a seventh aspect of the present invention, in the self-propelled cleaning robot of the first to sixth aspects, the structure is a solar cell array or a condensing mirror, the solar cell array or the condensing mirror being formed by arraying plural solar cell modules or mirrors.

Effect of the Invention

In the first aspect, the cleaning unit passes through the place where the floating is generated after the floating is eliminated, so that the generation of the portion that is not cleaned due to the floating can be prevented. Additionally, the cleaning unit passes through the place where the floating is generated again only when the floating is generated. That is, because the cleaning is performed again only when the floating is generated, a time necessary for the cleaning work can be shortened compared with the case that the cleaning is always performed again at a place where possibly the floating is generated. Accordingly, the work efficiency can be improved to suppress the cost necessary for the cleaning work.

In the second aspect, only the inclination of the robot main body is detected, so that the generation of the floating can be detected with the simple configuration.

In the third aspect, because the floating is detected by detecting a load torque of a motor, it is not necessary to provide a special sensor that detects the floating. Therefore, the configuration of the controller can be simplified.

In the fourth aspect, the travel on the flat surface is stopped when the inclination angle of the structure is greater than or equal to the predetermined angle, namely, when the angle at which the cleaning cannot be performed is detected, so that the robot can be prevented from dropping from the flat surface.

In the fifth aspect, the robot is held in the base before the inclination angle of the structure is greater than or equal to the predetermined angle, so that the robot can surely be prevented from dropping from the flat surface even if the inclination angle of the structure increases. When the inclination angle of the structure decreases, the robot moves from the base to the flat surface, so that the cleaning of the flat surface can be started. That is, the cleaning of the flat surface and the return to the base are automatically switched according to the inclination of the structure, so that the flat surface of the structure can automatically be cleaned.

In the sixth aspect, the robot is fixed to the structure by the absorbing unit before the inclination angle of the structure is greater than or equal to the predetermined angle, so that the robot can surely be prevented from dropping from the flat surface even if the inclination angle of the structure increases. When the inclination angle of the structure decreases, the robot fixed by the fixing unit is released to be able to travel on the flat surface. Thus, the cleaning of the flat surface can be started. That is, the cleaning of the flat surface and the fixing to the structure are automatically switched according to the inclination of the structure, so that the flat surface of the structure can automatically be cleaned.

In the seventh aspect, the generation of an unsatisfied cleaning portion is prevented even if the step or the gap exists between the plural solar cell modules or mirrors, so that the degradation of the power generation performance can be prevented.

A self-propelled cleaning robot of the present invention is a robot that cleans a flat portion of a structure, and the self-propelled cleaning robot has a feature that cleaning work can efficiently be performed even if a step or the like is formed in the flat portion.

The structure that becomes a cleaning target of the self-propelled cleaning robot of the present invention is a structure including a flat surface, but there is no particular limitation to the structure as long as a self-propelled cleaning robot 1 can move along the flat surface. Examples of the structure include a solar cell array of a large-scale solar power generation facility, a condensing mirror in a solar thermal power generation facility, and a solar water heater.

Examples of the flat surface to be cleaned include a surface (that is, light receiving surface of solar cell module) of the solar cell array, a surface (that is, light receiving surface of mirror) of the condensing mirror, and a light receiving surface of the solar water heater. In the description, the flat surface is a concept including not only a flat surface that is of a level surface like a solar cell array but also a substantially flat curved surface having a large curvature radius like a condensing mirror.

Hereinafter, the plural structure bodies (modules) are referred to as modules M, and the structure is referred to as a structure SP. A cleaning target surface (that is, each light receiving surface) of the structure SP is referred to as a target flat surface SF, and a surface of each module M is simply referred to as a surface S.

(Description of Self-Propelled Cleaning Robot 1)

Figure 1:
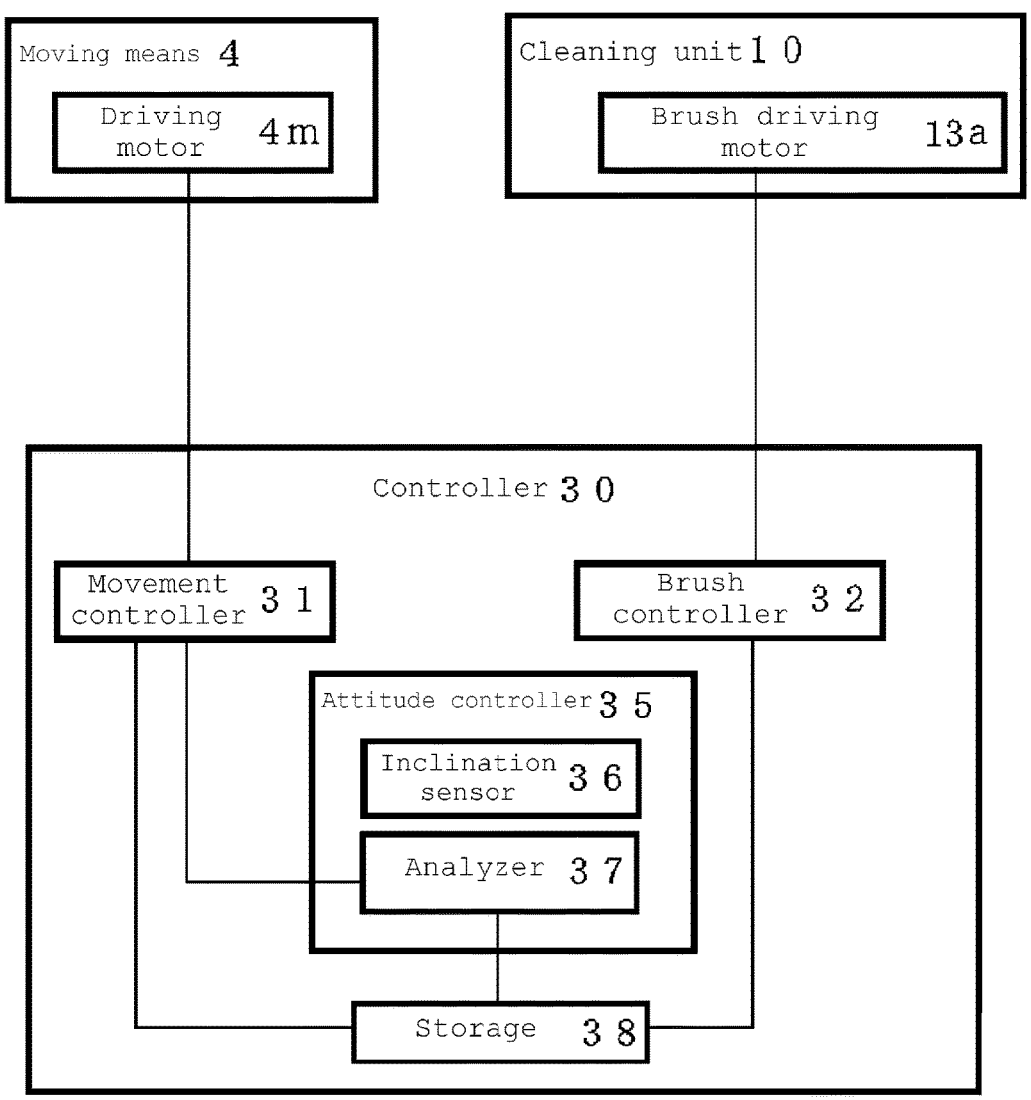
FIG. 1 is a schematic block diagram illustrating an self-propelled cleaning robot 1 according to an embodiment.
Figure 5:
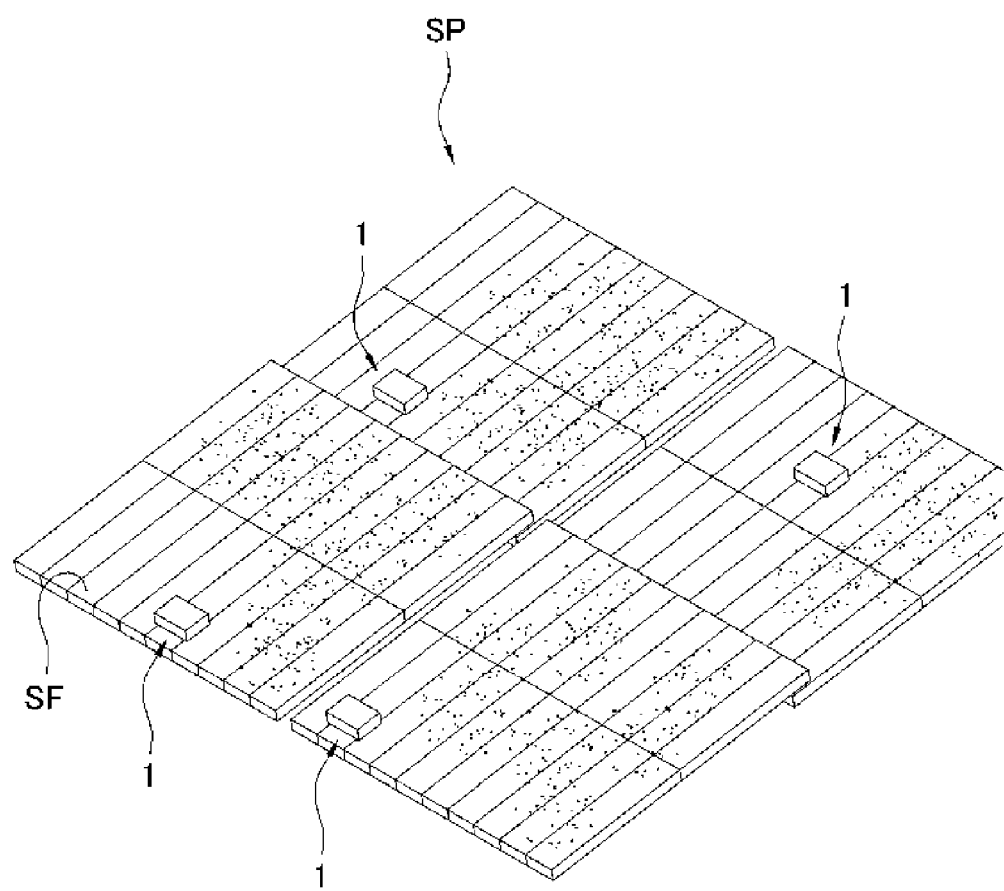
FIG. 5 is a schematic explanatory view illustrating a structure SP cleaned by the self-propelled cleaning robot 1 of the embodiment.

As illustrated in FIG. 1, an self-propelled cleaning robot 1 according to an embodiment includes a robot main body 2 provided with a moving means 4 traveling on the target flat surface SF of the structure SP (see FIG. 5), a pair of cleaning units 10 and 10 provided in the robot main body 2, and a controller 30 (see FIG. 1) that controls activation of the moving means 4 or the pair of cleaning units 10 and 10.

In the self-propelled cleaning robot 1 of the embodiment, the controller 30 includes an attitude controller 35 that detects an attitude of the robot main body 2. The attitude controller 35 can detect floating of the robot main body 2, specifically whether the pair of cleaning units 10 and 10 floats from the target flat surface SF of the solar cell SP.

The self-propelled cleaning robot 1 of the embodiment has a feature in that the controller 30 can detect the floating of the robot main body 2. First an outline of the self-propelled cleaning robot 1 will be described.

(Robot Main Body 2)

Figure 2:
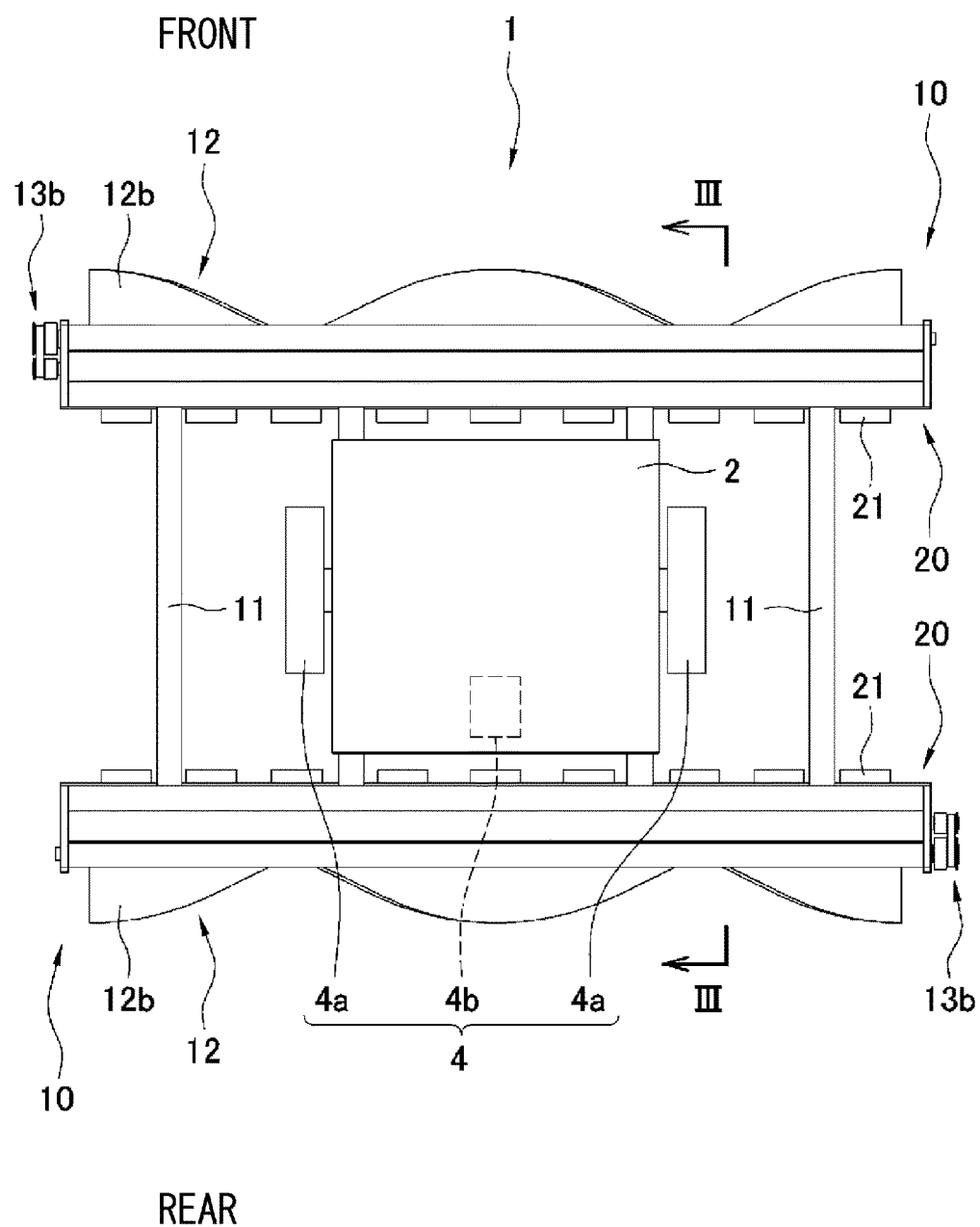
FIG. 2 is a schematic plan view illustrating an self-propelled cleaning robot 1 according to an embodiment.
Figure 3:
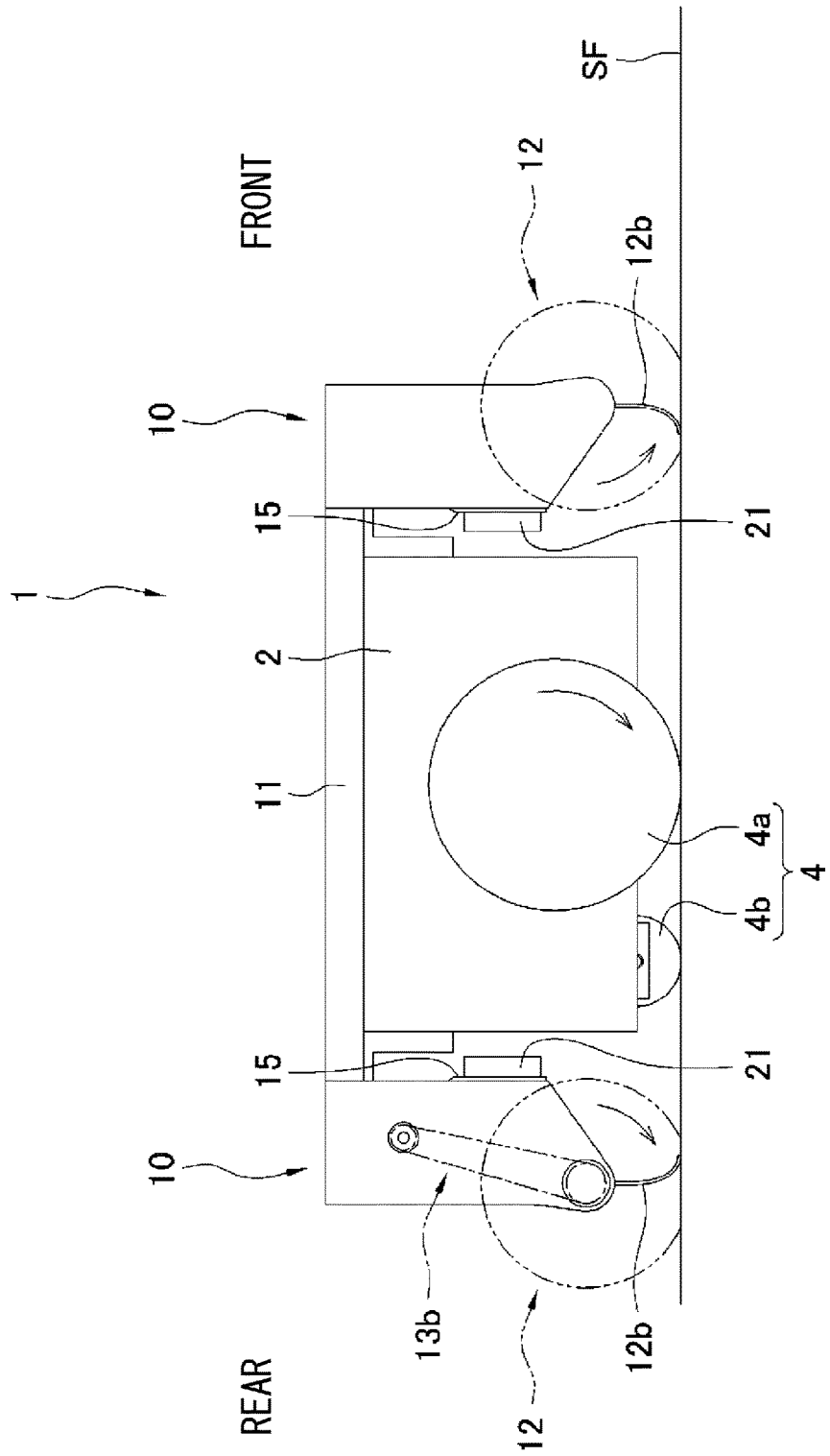
FIG. 3 is a schematic side view illustrating the self-propelled cleaning robot 1 of the embodiment.

As illustrated in FIGS. 2 to 3, the robot main body 2 includes a moving mechanism 4 that moves the self-propelled cleaning robot 1 along the target flat surface SF of the structure SP.

The moving mechanism 4 includes a pair of lateral driving wheels 4a and 4a and an intermediate driving wheel 4b. Specifically, the pair of lateral driving wheels 4a and 4a and the intermediate driving wheel 4b are arranged so as to form a triangle in planar view (see FIG. 2).

Therefore, the self-propelled cleaning robot 1 can stably be arranged on the target flat surface SF.

A general wheel that can rotate only about a rotation shaft is used as the pair of lateral driving wheels 4a and 4a while an omni wheel (omni-directional movable wheel) is used as the intermediate driving wheel 4b. All the driving wheels 4a and 4b of the moving mechanism 4 are connected to driving motors, respectively, and the driving motor can independently drive each of the driving wheels 4a and 4b. Rotation speed of all the driving motors are controlled by a controller provided in the robot main body 2.

When the controller controls the rotation speed of each driving motor, the self-propelled cleaning robot 1 can linearly or turnably be moved.

In the robot main body 2, a direction in which a side surface where a pair of lateral driving wheels 4a and 4a is not provided exists (in FIG. 2, a vertical direction) is referred to as a front-rear direction of the self-propelled cleaning robot 1. Hereinafter, a side (in FIG. 2, a lower side) of an intermediate driving wheel 4b with respect to the pair of lateral driving wheels 4a and 4a is referred to as a rear portion, and an opposite side (in FIG. 2, an upper side) is referred to as a front portion.

The controller controls the rotation speed of each driving motor to control the movement of the self-propelled cleaning robot 1. A moving passage of the self-propelled cleaning robot 1 is stored in the controller, and the self-propelled cleaning robot 1 may automatically move on the target flat surface SF along the moving passage. The movement of the self-propelled cleaning robot 1 may be controlled by supplying a signal to the controller from the outside. For example, the movement of the self-propelled cleaning robot 1 may remotely be controlled using a remote controller.

The driving wheels 4a,4a,4b is not limited to the above configuration, but the driving wheels 4a,4a,4b may have any configuration as long as the driving wheels 4a,4a,4b can linearly or turnably move the self-propelled cleaning robot 1. For example, the omni wheel that is of the intermediate driving wheel 4b is not used as the driving wheel, but only the pair of driving wheels 4a and 4a may be used as the driving wheel. Instead of the omni wheel, a passive wheel (caster) may be used as the intermediate driving wheel 4b. Even in this case, the moving direction of the self-propelled cleaning robot 1 can freely be changed by adjusting the rotation speed of the pair of driving wheels 4a and 4a. The self-propelled cleaning robot 1 may have a structure similar to that of a usual vehicle. That is, four wheels are provided, and the two front (or rear) wheels may be used as a steering wheel while other wheels are used as a driving wheel, or the four wheels may be used as the driving wheel.

(Cleaning Unit 10)

Figure 4:
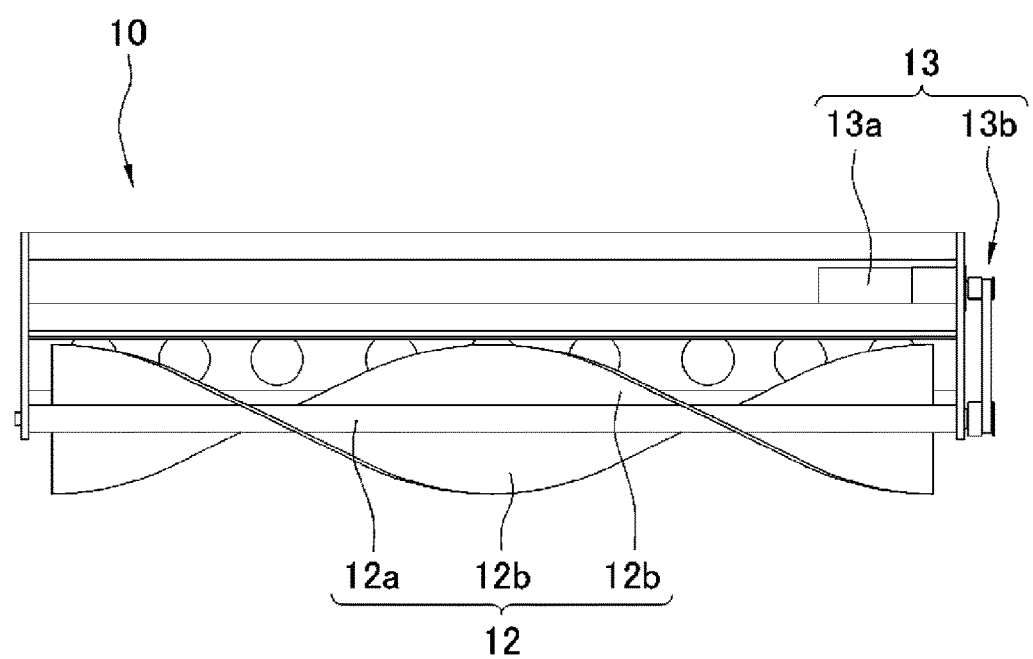
FIG. 4 is a schematic front view illustrating the self-propelled cleaning robot 1 of the embodiment.

As illustrated in FIGS. 2 to 4, a pair of cleaning units 10 and 10 is provided in front of and at the rear of the robot main body 2, respectively.

As illustrated in FIGS. 1 and 2, the cleaning unit 10 is coupled to the robot main body 2 by a frame 11. The cleaning unit 10 includes a brush 12. The brush 12 includes a shaft unit 12a and a pair of brush units 12b and 12b that are provided on an outer circumferential surface of the shaft unit 12a (see FIG. 3).

Both end portions of the shaft unit 12a are rotatably supported by the frame of the cleaning unit 10. Additionally, the shaft unit 12a is provided such that an axis direction of the shaft unit 12a is substantially parallel to the target flat surface SF when the self-propelled cleaning robot 1 is placed on the target flat surface SF.

The pair of brush units 12b and 12b is formed by arraying plural brushes along the axis direction. Each brush unit 12b is provided such that a brush position deviates along a circumferential direction according to the movement of the shaft unit 12a in the axis direction (see FIGS. 2 and 4). In other words, each brush unit 12b is formed into a spiral shape on aside surface of the shaft unit 12a. The pair of brush units 12b and 12b are arranged so as to form a double spiral. That is, the pair of brush units 12b and 12b is formed such that the brushes of the pair of brush units 12b and 12b rotates by 180 degrees with respect to each other in a section orthogonal to the axis direction of the shaft unit 12a (see FIG. 4).

As illustrated in FIG. 4, the cleaning unit 10 includes a brush driving unit 13 that rotates the shaft unit 12a about the axis of the brush 12. Specifically, the brush driving unit 13 includes a brush driving motor 13a, and a main shaft of the brush driving motor 13a is coupled to an end portion of the shaft unit 12a of the brush 12 by a belt pulley mechanism 13b. An operating state of the brush driving motor 13a is controlled by the controller.

Therefore, when the brush driving motor 13a is activated, a driving force of the brush driving motor 13a is transmitted to the shaft unit 12a of the brush 12 through the belt pulley mechanism 13b, which allows the brush 12 to be rotated.

There is no particular limitation to a length of the brush constituting the pair of brush units 12b and 12b. The length of the brush may be formed to an extent in which a leading end of the brush can sweep and clean the target flat surface SF while the self-propelled cleaning robot 1 travels on the target flat surface SF. For example, in the case that the target flat surface SF is the surface of the solar cell module in which the plural solar cells are arrayed, the length of the brush may be formed to an extent in which the leading end of the brush can sweep and clean the target flat surface SF while the pair of lateral driving wheels 4a and 4a is placed on the frames formed at end edges of the solar cell. Specifically, assuming that a distance from the surface of the solar cell module to an upper end of the frame is 1.5 mm, and that a distance from the target flat surface SF to an outer circumferential surface of the shaft unit 12a is 37 mm when the self-propelled cleaning robot 1 is placed on the target flat surface SF, preferably the length of the brush ranges from about 45 mm to about 47 mm.

However, the length of the brush depends on other parameters of the self-propelled cleaning robot 1 such as rigidity of the brush, but the length of the brush is not limited to the above size. The floating of the brush 12 caused by the inclined robot main body 2 is hardly generated when the length of the brush is set longer than 47 mm. At the same time, when the length of the brush is excessively lengthened, there is a possibility of extremely degrading the cleaning performance of the self-propelled cleaning robot 1 that is traveling on the target flat surface SF (the state in which the lateral driving wheels 4a and 4a and the intermediate driving wheel 4b are in contact with the identical flat surface) or the traveling performance of the self-propelled cleaning robot 1. A load torque increases in the brush driving motor 13m and the driving motors 4m of the driving wheels 4a,4a,4b, which results in a problem that power consumption increases. Accordingly, the length of the brush may be set to the proper length according to the target flat surface SF cleaned by the self-propelled cleaning robot 1 or an environment of the target flat surface SF.

The brush of each brush unit 12b may not necessarily be arranged into the spiral shape. Alternatively, for example, the brush may linearly be arranged along the axis direction of the shaft unit 12a.

In the embodiment, by way of example, the cleaning unit 10 cleans the target flat surface SF using a brush 12. There is no particular limitation to a method in which the cleaning unit 10 cleans the target flat surface SF. For example, a water sprinkler (such as a spray nozzle) and a wiper blade (squeegee) may be provided in the cleaning unit 10 in addition to the brush 12, or the water sprinkler (such as a spray nozzle) and the wiper blade (squeegee) may be provided in the cleaning unit 10 instead of the brush 12. A vacuum cleaner may be provided in addition to the brush 12, or only the vacuum cleaner may be provided without providing the brush 12.

(Controller 30)

The controller 30 will be described below.

As illustrated in FIG. 1, the controller 30 includes a movement controller 31, a brush controller 32, and the attitude controller 35.

(Movement Controller 31)

The movement controller 31 controls and monitors the activation of each of the driving motors 4m that drive the pair of lateral driving wheels 4a and 4a and the intermediate driving wheel 4b in the moving means 4. The movement controller 31 controls the activation of each of the three driving motors 4m to control a moving direction or a moving speed of the robot main body 2, namely, the moving direction or moving speed of the self-propelled cleaning robot 1. For example, the self-propelled cleaning robot 1 can be moved straight in the case that the driving motors 4m are activated such that the moving speed (specifically, rotation speed (revolving speed)×circumferential length of driving wheel) of all the dying wheels 4a,4a,4b are equal to one another. On the other hand, the self-propelled cleaning robot 1 can be moved so as to turn in the case that the driving motors 4m are activated such that a difference in moving speed is generated between the pair of lateral driving wheels 4a and 4a.

When the attitude controller 35 detects the floating of the robot main body 2, the movement controller 31 has a function of controlling the activation of the moving means 4 such that one of the cleaning units 10 passes through a place where the floating is detected after the floating is eliminated.

For example, in the case that the pair of cleaning units 10 and 10 is provided in the front portion and rear portion of the robot main body 2 as illustrated in FIG. 2, the movement controller 31 controls the activation of the moving means 4 such that the robot main body 2 recedes when the floating is eliminated after detected. Therefore, the cleaning unit 10 in the rear portion can be passed through the place where the floating is detected again.

In the case that the cleaning unit 10 is provided only in the front portion of the robot main body 2, the movement controller 31 controls the activation of the moving means 4 such that the robot main body 2 travels forward after a 180-degree change of direction when the floating is eliminated after detected. Therefore, the cleaning unit 10 can be passed through the place where the floating is detected again.

(Brush Controller 32)

The brush controller 32 monitors and controls activation of the brush driving motor 13a.

There is no particular limitation to the configuration of the brush controller 32. Preferably the brush controller 32 has a current detection function of detecting a current passed through the brush driving motor 13a. Specifically, as described later, preferably the brush controller 32 also has a function of detecting a frictional force against the rotation of the brush 12 based on the current supplied to the brush driving motor 13a.

In order to detect the frictional force of the brush 12, it is necessary to detect the current passed through the brush driving motor 13a. Usually, unless the floating of the brush is generated, the current changes slightly due to a dirt of the surface to be cleaned and a characteristic of the brush. In the case that the revolving speed of the brush driving motor 13a is controlled by PWM control, the current changes according to a change in voltage because the voltage having a rectangular wave is applied to the brush driving motor 13a. Thus, the current passed through the brush driving motor 13a varies due to various factors, it is necessary to remove the variation in current caused by the factors other than the variation in frictional force of the brush 12 in order to understand the contact state of the brush from the current. There is no particular limitation to a method for removing the variation factors. For example, the variations other than a frequency indicating a change in contact state of the brush are removed by performing filtering processing on the measured current, or only a large change in current generated in a short time is detected by differentiating the current, thereby detecting the generation of the change in contact state of the brush.

(Attitude Controller 35)

The attitude controller 35 detects the attitude of the robot main body 2. Specifically, the attitude controller 35 detects the floating of the robot main body 2, namely, whether one of the pair of cleaning units 10 and 10 floats from the target flat surface SF.

The term "one of the pair of cleaning units 10 and 10 floats from the target flat surface SF" is a concept including not only the case that the leading end of the brush unit 12b of the brush 12 separates completely from the target flat surface SF, but also the case that the leading end of the brush unit 12b is in slight contact with the target flat surface SF. That is, the cleaning performance degrades in the case that a bending amount (a bending amount of the brush unit 12b bent by pressing the brush 12 against the target flat surface SF) of the brush unit 12b of the brush 12 decreases more than to some extent even if the leading end of the brush unit 12b of the brush 12 does not completely separate from the target flat surface SF. Thus, the state in which the cleaning performance of the brush 12 degrades even if the brush unit 12b of the brush 12 is in contact with the target flat surface SF is included in the state in which the floating is generated in the description.

The attitude controller 35 includes an inclination sensor 36 that detects an inclination of the robot main body 2 as a floating sensor that detects the floating of the pair of cleaning units 10 and 10. The inclination sensor 36 detects how much inclination in the front-rear direction of the robot main body 2 is with respect to the horizontal direction. The inclination sensor 36 is electrically connected to an analyzer 37 of the attitude controller 35, and the analyzer 37 detects whether the floating of the robot main body 2 is generated. The analyzer 37 transmits a floating signal to the movement controller 31 when the floating is generated, and analyzer 37 transmits a return signal to the movement controller 31 when the floating is eliminated.

There is no particular method in which the analyzer 37 determines whether the floating is generated. For example, the following method can be adopted.

When the self-propelled cleaning robot 1 is placed on the target flat surface SF, the analyzer 37 stores the inclination of the robot main body 2 as a reference value. The inclination of the robot main body 2 is detected by the inclination sensor 36. When the self-propelled cleaning robot 1 moves, the analyzer 37 compares the inclination detected by the inclination sensor 36 to the reference value, and the analyzer 37 determines that the floating is generated when a deviation from the reference value is greater than or equal to a predetermined angle.

For example, in the case that the target flat surface SF is the surface of the solar cell module of the solar power generation array installed in a region on a latitude of about 20 degrees, usually the reference value (that is, a mounting angle of the solar power generation array) ranges from about 15 degrees to about 20 degrees. In this case, the analyzer 37 determines that the floating is generated when the deviation from the reference value is greater than or equal to about 1 degree. The state in which the deviation from the reference value is greater than or equal to about 1 degree means a substantial inclination of the robot main body 2 when the pair of lateral driving wheels 4a and 4a moves from the surface of the solar cell to the frame portion (see FIG. 9(A)).

Hereinafter, the inclination of the robot main body 2 in which the analyzer 37 determines that the floating is generated is referred to as a floating angle.

The reference value is not limited to the above angle because the angle of the surface of the solar power generation array depends on the installation site, the latitude, and the like. Also the floating angle can properly be set according to a size or a shape of the self-propelled cleaning robot 1 or a situation of the target flat surface.

For example, in the case that the controller 30 includes a storage 38 to be able to previously understand the inclination of the target flat surface SF cleaned by the self-propelled cleaning robot 1, the reference value is stored in the storage 38, and the reference value may be used.

(Description of Operation of Self-Propelled Cleaning Robot 1 of the Embodiment)

The operation in the case that the floating is generated in the self-propelled cleaning robot 1 of the embodiment will be described below.

The case that the self-propelled cleaning robot 1 moves on the surface of the solar cell array, in which the solar cells having the rectangular target flat surfaces SF are arrayed, in a longitudinal direction of the solar cell module will be described below. It is assumed that the self-propelled cleaning robot 1 of the embodiment includes the pair of cleaning units 10 and 10 in the front and rear portions of the robot main body 2, and that usually the light receiving surface of the solar cell module is cleaned by both the cleaning units 10.

Figure 7:
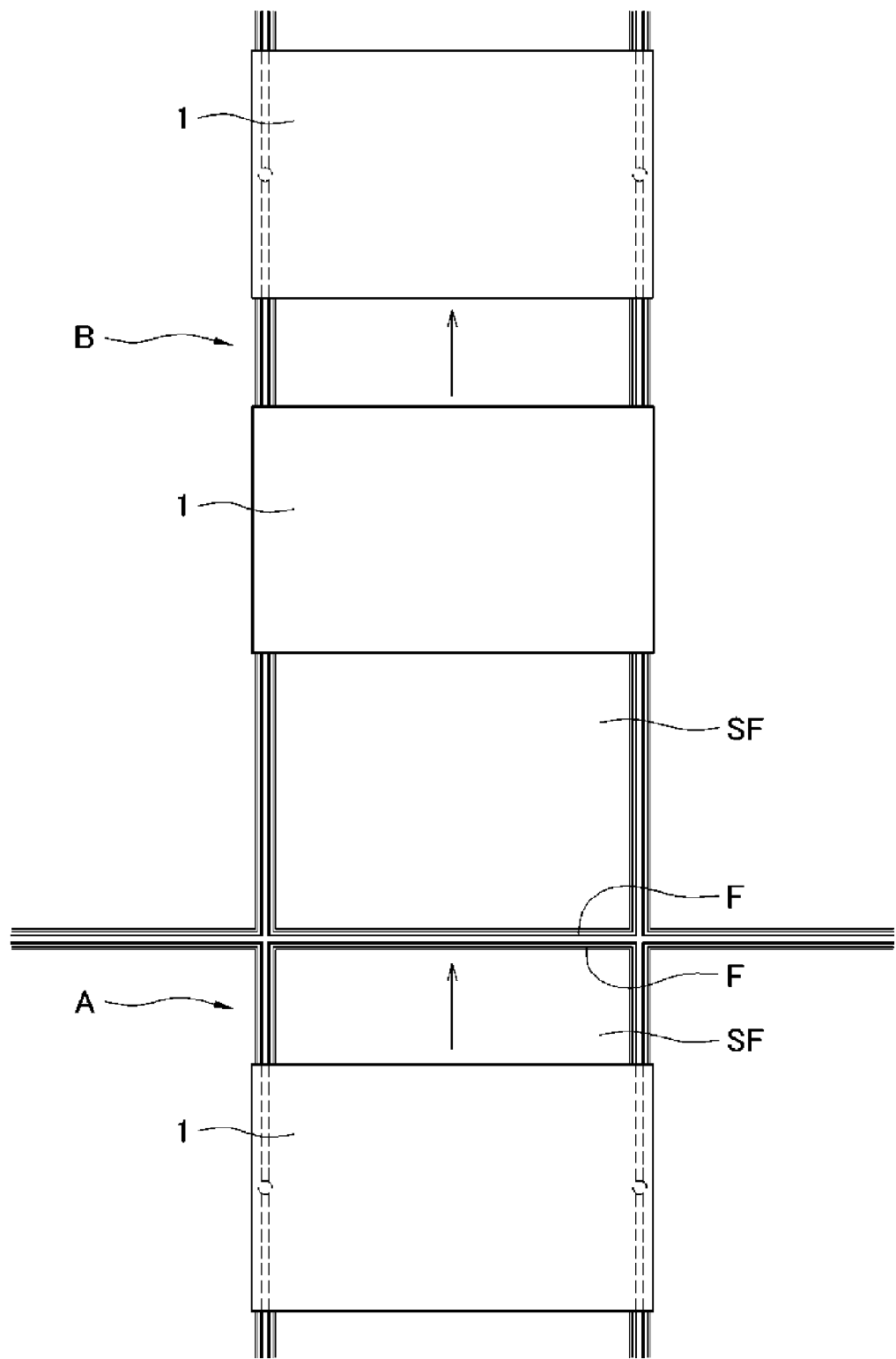
FIG. 7 is a schematic explanatory view illustrating a state in which the self-propelled cleaning robot 1 of the embodiment moves between solar cell modules A and B with little difference in level.

As illustrated in FIG. 7, when the self-propelled cleaning robot 1 moves in the longitudinal direction of a solar cell module A, the cleaning unit 10 arranged in the front portion of the robot main body 2 cleans the light receiving surface SF (that is, target flat surface SF) of the solar cell module A. When the self-propelled cleaning robot 1 further moves, the cleaning unit 10 arranged in the rear portion of the robot main body 2 cleans the portion cleaned by the cleaning unit 10 arranged in the front portion. That is, the target flat surface SF of the solar cell module A is cleaned twice by the cleaning unit 10.

When reaching a boundary between the solar cell module A and the solar cell module B, the self-propelled cleaning robot 1 moves from the solar cell module A to a solar cell module B.

Figure 6:
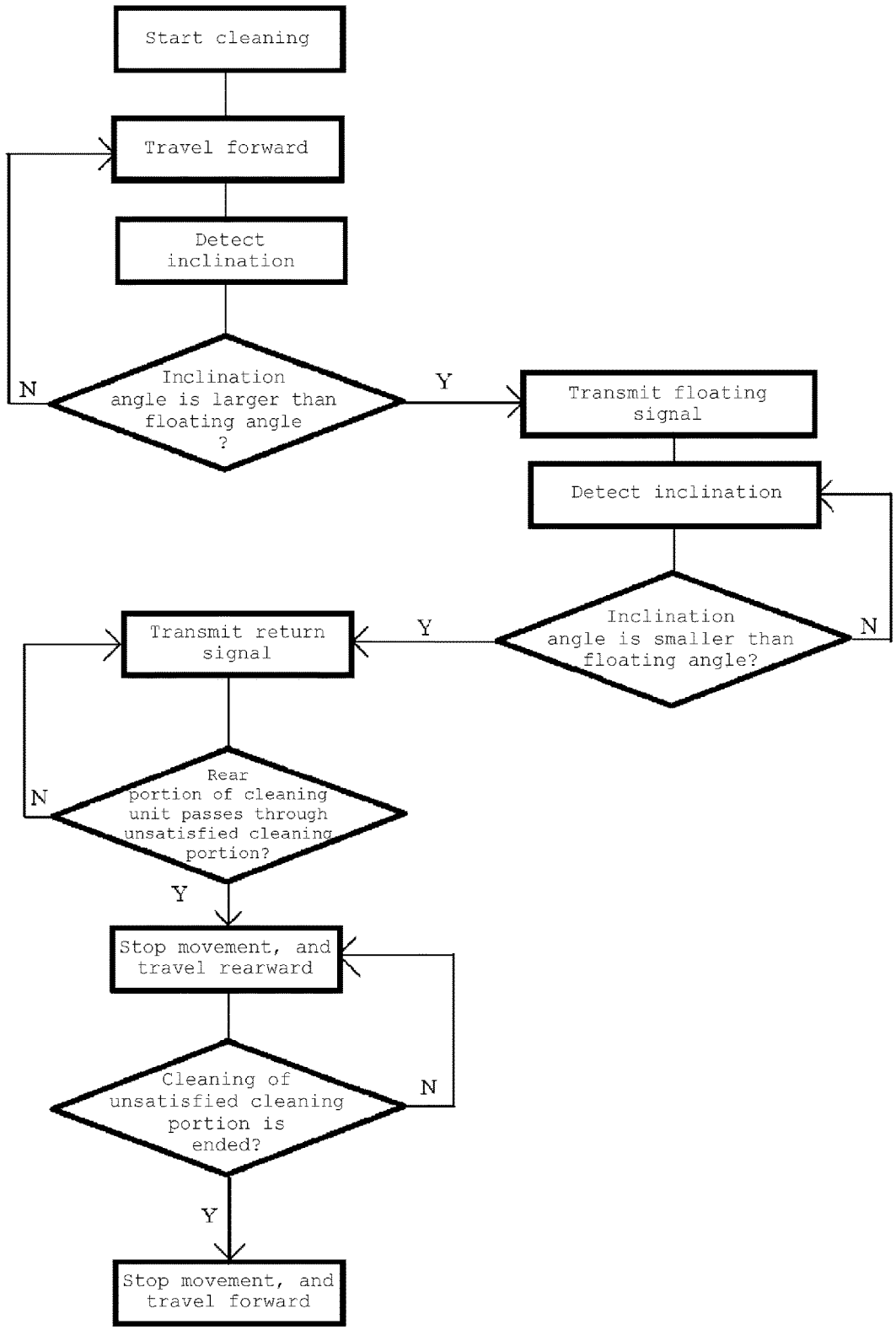
FIG. 6 is a work flowchart illustrating the self-propelled cleaning robot 1 of the embodiment.
Figure 9:
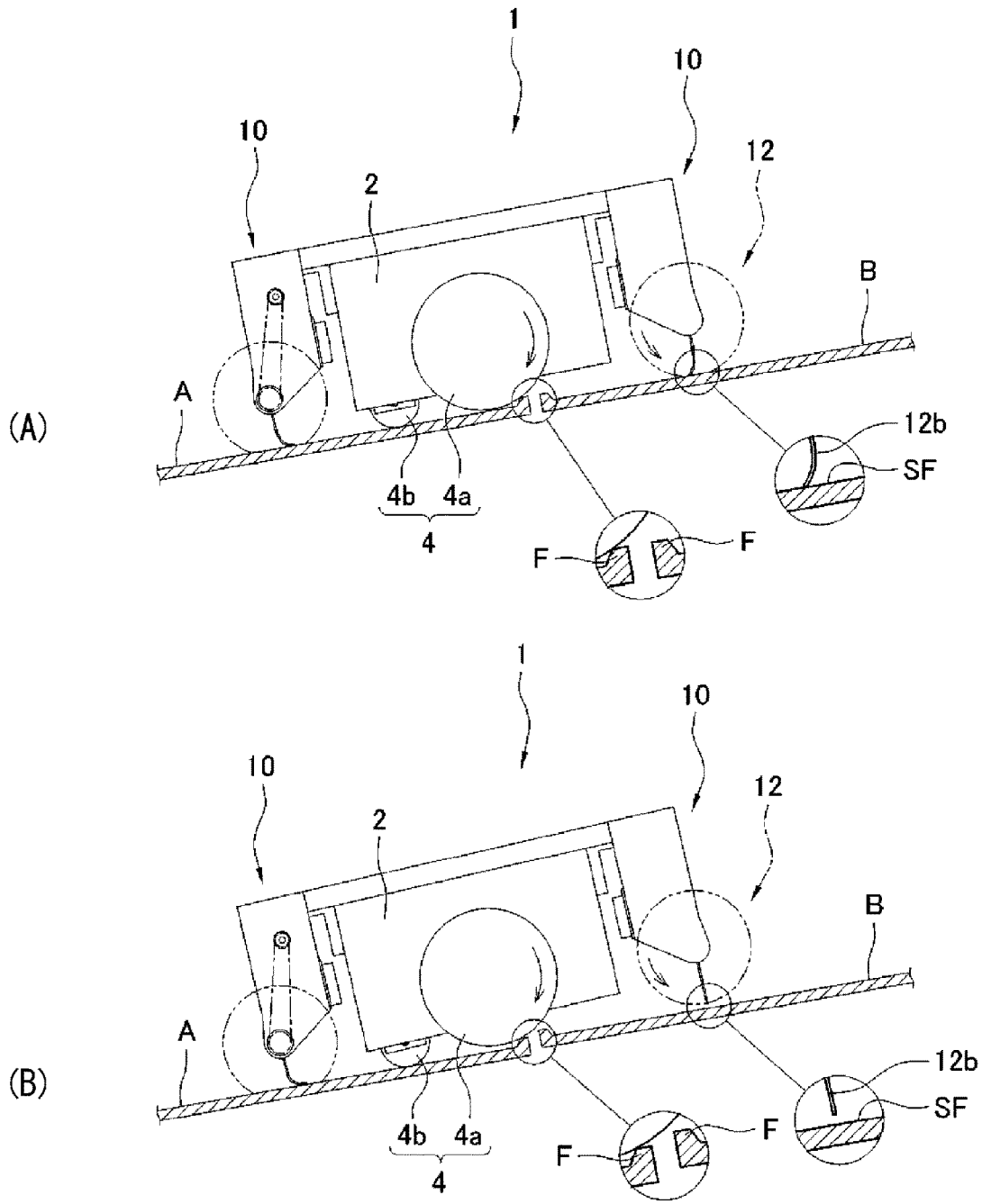
FIG. 9 is a schematic explanatory view illustrating a state in which the self-propelled cleaning robot 1 of the embodiment moves between the solar cell modules A and B.

As illustrated in FIG. 9(A), in the case that the target flat surface SF of the solar cell module A and the target flat surface SF of the solar cell module B are substantially flush with each other, an inclination angle of the robot main body 2 is smaller than the floating angle when the self-propelled cleaning robot 1 crosses over a frame F between the solar cell modules A and B. Because the analyzer 37 determines that the floating is not generated, the self-propelled cleaning robot 1 moves continuously along the longitudinal direction even after moving to the solar cell module B (see FIG. 6). In this case, the state in which the substantially whole surface of the target flat surface SF of the solar cell module B cleaned by the cleaning unit 10 twice is maintained, because the cleaning unit 10 in the front portion of the robot main body 2 continuously cleans the target flat surface SF of the solar cell module A when the self-propelled cleaning robot 1 crosses over the frame F (see a portion surrounded by a circle in FIG. 9(A)).

Figure 8:
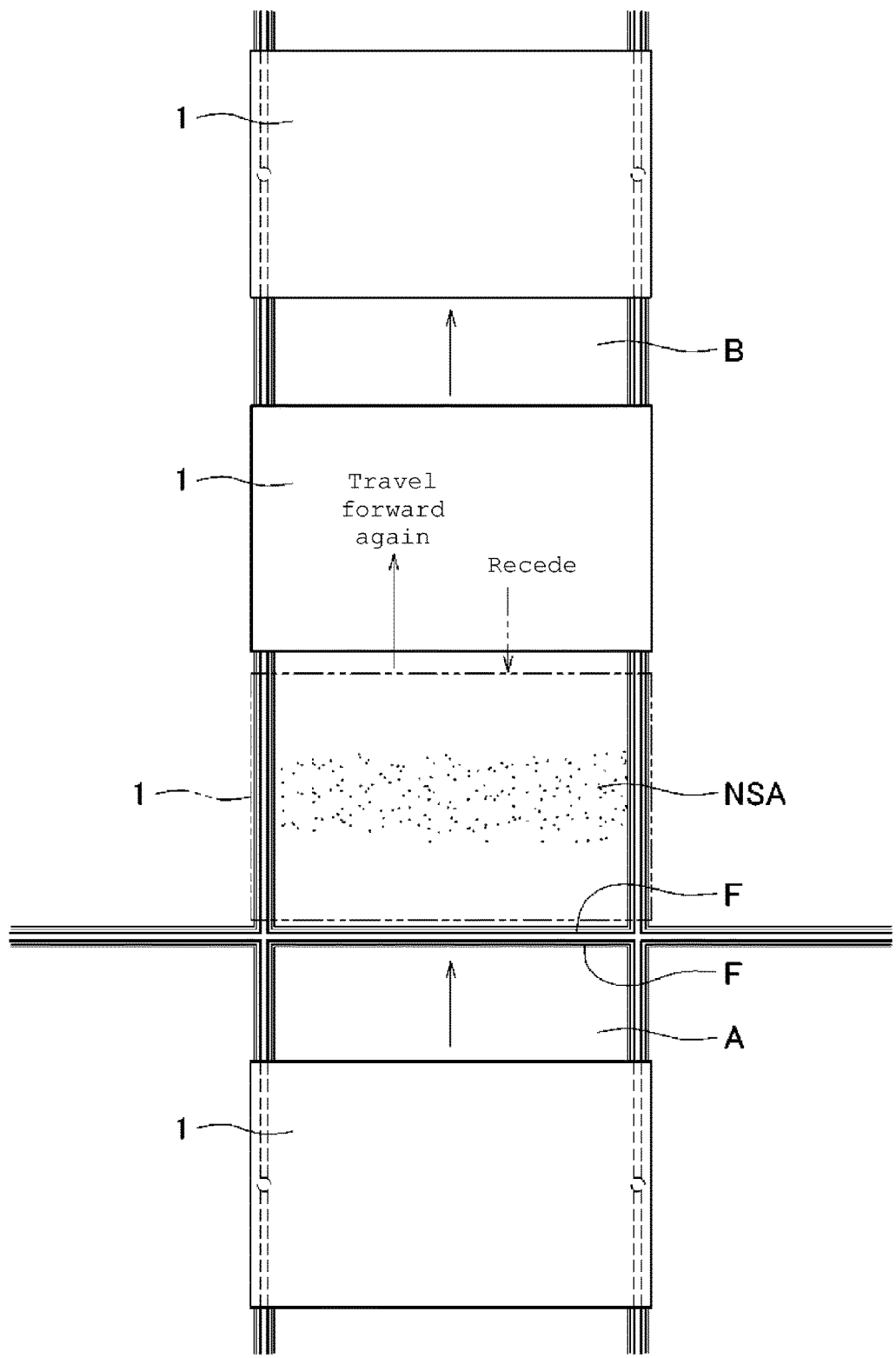
FIG. 8 is a schematic explanatory view illustrating a state in which the self-propelled cleaning robot 1 of the embodiment moves between the solar cell modules A and B with a difference in level.

On the other hand, in the case that a step is formed between the solar cell modules A and B as illustrated in FIG. 9(B), the inclination angle of the robot main body 2 is larger than the floating angle when the self-propelled cleaning robot 1 moves from the solar cell module A to the solar cell module B. The analyzer 37 determines that the floating is generated, and transmits a floating signal to the movement controller 31. A period until the floating is eliminated, namely, a period (for example, time or a moving distance) until the return signal is transmitted since the inclination angle is smaller than the floating angle is stored in the movement controller 31 (see FIG. 6). During the period, the brush 12 of the cleaning unit 10 in the front portion of the robot main body 2 floats from the target flat surface SF of the solar cell module B (see a portion surrounded by a circle in FIG. 9(B)). The target flat surface SF of the solar cell module B is not cleaned by the cleaning unit 10 in the front portion of the robot main body 2 until the return signal is transmitted to the movement controller 31. The portion that is not cleaned by the cleaning unit 10 in the front portion of the robot main body 2 is referred to as an unsatisfied cleaning portion NSA (see FIG. 8).

Then, a return signal is transmitted when the inclination angle of the robot main body 2 is smaller than the floating angle. When the cleaning unit 10 in the rear portion of the robot main body 2 passes through the unsatisfied cleaning portion NSA after the inclination angle of the robot main body 2 becomes the reference value, the self-propelled cleaning robot 1 stops tentatively and then moves in a reverse direction (see FIGS. 6 and 8). That is, after cleaned by the cleaning unit 10 in the rear portion of the self-propelled cleaning robot 1, the unsatisfied cleaning portion NSA is cleaned by the cleaning unit 10 in the rear portion again. When the cleaning unit 10 in the rear portion ends the cleaning of the unsatisfied cleaning portion NSA, because the self-propelled cleaning robot 1 stops tentatively and moves forward again, the cleaning of the target flat surface SF of the solar cell module B is maintained along the longitudinal direction of the solar cell module B.

As described above, in the self-propelled cleaning robot 1 of the embodiment, when the floating is generated to form the unsatisfied cleaning portion NSA, the unsatisfied cleaning portion NSA is cleaned by the cleaning unit 10 after the floating is eliminated, so that the unsatisfied cleaning portion NSA can be cleaned as an equal level as other portions even if the floating is generated.

In the case that the floating is generated, namely, only in the case that the unsatisfied cleaning portion NSA is generated, the movement of the self-propelled cleaning robot 1 is controlled such that the unsatisfied cleaning portion NSA is cleaned again. Therefore, the time necessary for the cleaning work can be shortened compared with the case that the place where possibly the floating is generated is always cleaned again, so that the work efficiency can be improved to suppress the cost necessary for the cleaning work.

In the embodiment, by way of example, the region of the unsatisfied cleaning portion NSA is detected by the movement controller 31. In the case that the potential place of the unsatisfied cleaning portion NSA is previously understood, the operation (re-cleaning operation) to clean the unsatisfied cleaning portion NSA is previously stored, and the re-cleaning operation may be performed when the movement controller 31 receives the floating signal.

For example, for the solar cell module including the frame F described above, a range of 180 mm to 280 mm distant from the frame F constitutes the unsatisfied cleaning portion NSA on the conditions that the step formed between the solar cell modules A and B is 5 mm, a distance (a distance in the front-rear direction) from the shaft unit 12a of the brush 12 to the pair of lateral driving wheels 4a and 4a is 205 mm, a distance from the intermediate driving wheel 4b to the pair of lateral driving wheels 4a and 4a is 93 mm, a diameter of the brush 12 is 110 mm, and a distance from the target flat surface SF to the outer circumferential surface of the shaft unit 12a is 37 mm. In this case, the operation until the rear end of the self-propelled cleaning robot 1 passes through the unsatisfied cleaning portion NSA, namely, the operation in which the self-propelled cleaning robot 1 travels rearward after the rear end of the self-propelled cleaning robot 1 moves by at least 280 mm distant from the frame F is stored as the re-cleaning operation. Therefore, in the case that the floating is generated when the self-propelled cleaning robot 1 moves from one of the solar cells to the other solar cell, the unsatisfied cleaning portion NSA can be cleaned by the cleaning unit 10.

(Other Floating Detection Sensors)

The floating detection sensor of the attitude controller 35 is not limited to the inclination sensor 36. Alternatively, for example, an acceleration meter that can detect a gravitation direction, a contact type range meter (such as a dial gage), and a non-contact type range meter (such as a laser range meter and an ultrasonic range meter) may be used as the floating detection sensor.

For the use of the range meter, at least two range meters are attached in the front-rear direction (or the pair of cleaning units 10 and 10) of the robot main body 2, and the attitude of the robot main body 2 is detected based on the traveling surface (target flat surface SF), thereby constituting the floating detection sensor.

Alternatively, the brush controller 32 may have the function of the floating detection sensor without providing the floating detection sensor. That is, the brush controller 32 may determine whether the floating is generated in the front portion or the rear portion of the robot main body 2 based on the current supplied to the brush driving motor 13a.

A reactive force applied to the brush unit 12b of the brush 12 from the target flat surface SF is decreased when the front portion or the rear portion of the robot main body 2 floats. The reactive force applied to the brush unit 12b of the brush 12 from the target flat surface SF is eliminated when the brush unit 12b of the brush 12 separates completely from the target flat surface SF. The current passed through the brush driving motor 13a decreases because the frictional force acting between the brush unit 12b and the target flat surface SF is decreased or eliminated. Accordingly, whether the floating is generated in the front portion or the rear portion of the robot main body 2 can be determined based on the current.

In this case, it is not necessary to provide a special sensor that detects the floating. Therefore, an advantage that the configuration of the controller 30 is simplified can also be obtained.

As to the current passed through the brush driving motor 13a, 1) the current changes slightly (is not kept constant) due to an influence of the dirt of the target flat surface SF or the characteristic of the brush 12, and 2) a noise caused by activation of another device is superposed on the current. For this reason, in the case that the reactive force is detected from the current passed through the brush driving motor 13a, it is necessary to remove the noise from the current in order to prevent the false detection of the floating caused by the influence of the noise. There is no particular limitation to a method for removing the noise from the current. For example, the high-frequency variation is removed by performing low-pass filter processing on the measured current, or only a large change in current generated in a short time is detected by differentiating the current with respect to the time.

(Other Embodiments)

Figure 10:
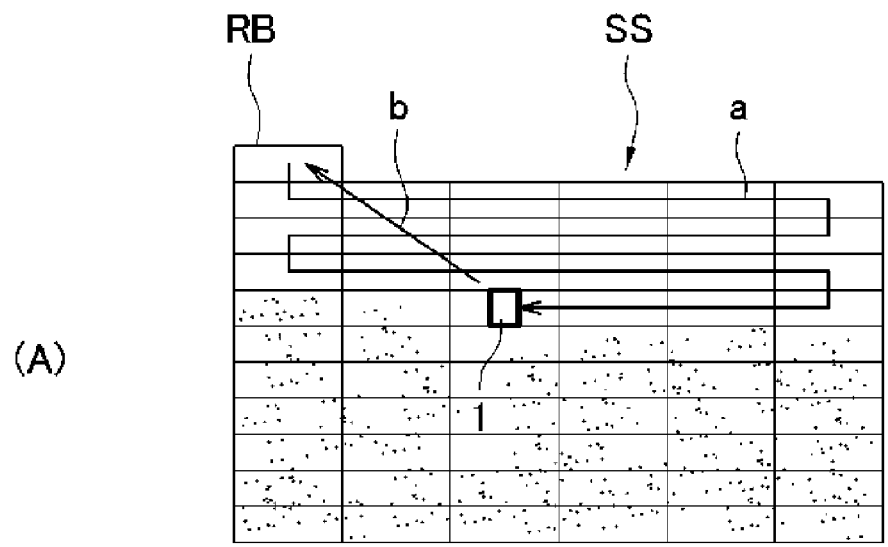
FIG. 10 is a schematic explanatory view illustrating a state in which the self-propelled cleaning robot 1 of the embodiment cleans a solar panel SS while moving between a robot base RB and a solar panel SS.
Figure 10:
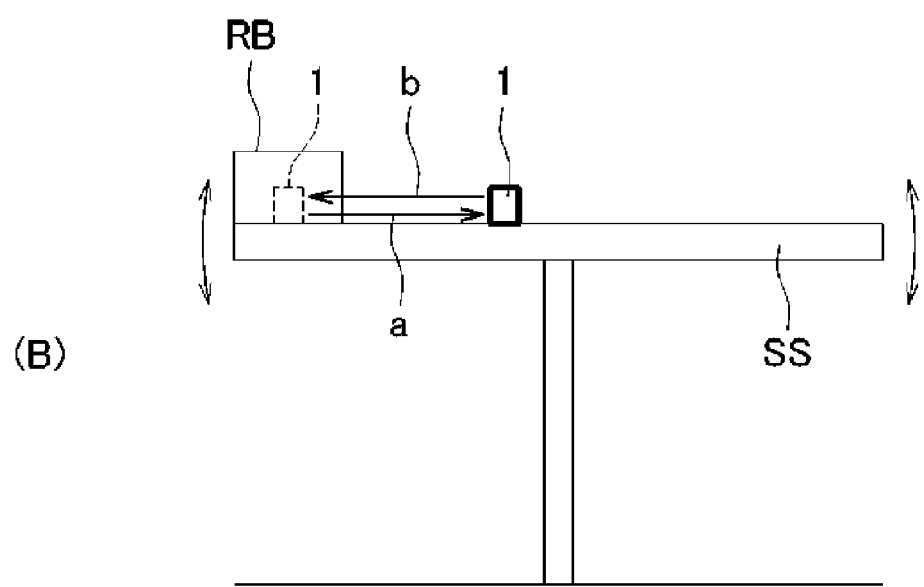

In some of the solar cell modules of the solar power generation or the condensing mirrors of the solar thermal power generation, the inclination changes in order to maintain power generation efficiency at a high level (see FIG. 10). In the case that the self-propelled cleaning robot 1 cleans the light receiving surface of the solar cell module or condensing mirror in which the inclination changes, the following control can be performed when the controller 30 can understand the inclination angle of the light receiving surface or the change in inclination angle.

There is no particular limitation to a method in which the controller 30 understands the inclination angle of the light receiving surface of the solar cell module or condensing mirror or the change in inclination angle. For example, a signal regarding the inclination angle of the light receiving surface of the solar cell module or condensing mirror is transmitted to the controller 30 from the outside (such as a controller that controls the inclination angle of the light receiving surface of the solar cell module or condensing mirror), whereby the controller 30 may understand the inclination angle or the change in inclination angle. In the case that the controller 30 includes the attitude controller 35 while the attitude controller 35 includes the inclination sensor 36 like the above embodiment, the controller 30 can understand the inclination angle or the change in inclination angle based on the inclination detected by the inclination sensor 36. Alternatively, the controller 30 can understand the inclination angle or the change in inclination angle based on both the external signal and the signal indicating the inclination detected by the inclination sensor 36.

The case that the controller 30 understands the inclination angle or the change in inclination angle based on both the external signal and the signal indicating the inclination detected by the inclination sensor 36 will be described below.

Hereinafter, the solar cell module of the solar power generation and the condensing mirror of the solar thermal power generation are collectively referred to as a solar panel SS.

In the control of the solar panel SS, an angle (hereinafter, referred to as an inclination angle of the solar panel SS) of the light receiving surface is momentarily changed with respect to the horizontal direction such that the light receiving surface and solar radiation form a proper angle (such that the light receiving surface and the solar radiation form a substantially right angle in the solar cell module of the solar power generation or the condensing mirror of the trough or dish type solar thermal power generation, and such that the light receiving surface and the solar radiation form an angle at which the solar radiation is collected into a heat collection unit of a heat collection tower in the condensing mirror of the tower type solar thermal power generation). Therefore, the inclination angle of the solar panel SS changes from the horizontal angle to the vertical angle. Sometimes the solar panel SS is inclined only in one direction (for example, a direction in which a right end (or a left end) rises with respect to the horizontal direction in FIG. 10), and sometimes the solar panel SS is inclined in both the directions (the right end and the left end rise with respect to the horizontal direction in FIG. 10).

On the other hand, the self-propelled cleaning robot 1 performs the cleaning while the inclination angle of the solar panel SS becomes an angle (for example, an angle from the horizontal angle to about 15 degrees) at which the self-propelled cleaning robot 1 travels easily.

Accordingly, the self-propelled cleaning robot 1 performs the cleaning when the inclination angle of the solar panel SS becomes the angle at which the self-propelled cleaning robot 1 travels easily, or when the inclination angle of the solar panel SS is adjusted to the angle at which the self-propelled cleaning robot 1 travels easily in order to perform the cleaning.

However, the inclination angle of the solar panel SS is not always maintained at the angle at which the self-propelled cleaning robot 1 travels easily until the self-propelled cleaning robot 1 cleans the whole light receiving surface. Even in the case that the inclination angle of the solar panel SS is adjusted to the angle at which the self-propelled cleaning robot 1 travels easily in order to perform the cleaning, the inclination angle of the solar panel SS is not always maintained at the angle at which the self-propelled cleaning robot 1 travels easily until the self-propelled cleaning robot 1 cleans the whole light receiving surface. This is because the power generation cannot substantially be performed during the time period in which the inclination angle of the solar panel SS is maintained at the angle at which the self-propelled cleaning robot 1 travels easily, and preferably the time period in which the inclination angle of the solar panel SS is maintained at the angle at which the self-propelled cleaning robot 1 travels easily is shortened as much as possible.

Therefore, in the case that the inclination angle of the solar panel SS is adjusted for the purpose of the cleaning performed by the self-propelled cleaning robot 1, when the cleaning time is lengthened, possibly the inclination angle of the solar panel SS changes from the angle at which the self-propelled cleaning robot 1 travels easily to the angle suitable for the power generation even if the self-propelled cleaning robot 1 performs the cleaning. In the case that the inclination angle of the solar panel SS is not adjusted for the purpose of the cleaning, possibly the inclination angle of the solar panel SS changes from the angle at which the self-propelled cleaning robot 1 travels easily during the cleaning performed by the self-propelled cleaning robot 1.

When the inclination angle of the solar panel SS increases largely, possibly the self-propelled cleaning robot 1 drops from the solar panel SS.

In order to prevent the drop of the self-propelled cleaning robot 1, preferably the self-propelled cleaning robot 1 is activated as follows based on the inclination angle of the solar panel SS.

(The Case that Robot Base RB is Provided)

In the case that the solar panel SS includes a robot base RB in which the self-propelled cleaning robot 1 is accommodated, the activation of the self-propelled cleaning robot 1 is controlled as follows.

The robot base RB accommodates the self-propelled cleaning robot 1 in the case that the self-propelled cleaning robot 1 does not perform the cleaning.

The robot base RB is arranged such that a floor surface of the robot base RB is flush with the surface of the solar panel SS, and the robot base RB is formed such that the self-propelled cleaning robot 1 can move smoothly between the robot base RB and the surface of the solar panel SS.

In the case that the robot base RB is provided, the analyzer 37 determines whether the inclination angle of the solar panel SS is a cleanable angle (for example, from the horizontal angle to about 15 degrees, corresponding to "the inclination angle of the flat surface of the structure is less than a predetermined angle" in claims) previously stored in the self-propelled cleaning robot 1 based on the signal from the inclination sensor 36, and the analyzer 37 transmits the return signal to the movement controller 31 in the case that the inclination angle becomes the cleanable angle. The movement controller 31 holds the return signal until receiving a new signal (for example, an inclination start announcing signal (to be described later)).

On the other hand, the external controller that controls the activation of the solar panel SS notifies the analyzer 37 of an inclination notification signal. The inclination notification signal indicates that the inclination angle of the solar panel SS changes from the angle at which the solar panel SS can be cleaned to the angle (for example, angle of 15 degrees or more) at which the solar panel SS cannot be cleaned (corresponding to "the inclination angle of the flat surface of the structure is greater than or equal to a predetermined angle" in claims). When detecting the inclination notification signal, the analyzer 37 may transmit the inclination start announcing signal to the movement controller 31. The movement controller 31 holds the inclination start announcing signal until receiving a new signal (for example, the return signal).

When the movement controller 31 receives a cleaning start signal while holding the return signal, the movement controller 31 activates the moving means 4 such that the self-propelled cleaning robot 1 moves on the solar panel SS along a predetermined route.

When the movement controller 31 receives the inclination start announcing signal, the movement controller 31 activates the moving means 4 such that the self-propelled cleaning robot 1 returns to the robot base RB from the solar panel SS by the most direct way.

When the solar panel SS becomes horizontal from the inclined state, the self-propelled cleaning robot 1 moves from the robot base RB onto the solar panel SS, and moves along the predetermined route (an arrow a in FIG. 10), so that the self-propelled cleaning robot 1 can clean the surface of the solar panel SS along the predetermined route (see FIGS. 10(A) and 10(B)).

On the other hand, when the inclination of the solar panel SS is started while the self-propelled cleaning robot 1 travels on the surface of the solar panel SS, the self-propelled cleaning robot 1 returns to the robot base RB by the most direct way (arrow b in FIG. 10). Therefore, the self-propelled cleaning robot 1 can be prevented from dropping from the solar panel SS when the solar panel SS is inclined (see FIGS. 10(A) and 10(B)).

In the configuration, the self-propelled cleaning robot 1 moves while automatically switching between the cleaning of the surface of the solar panel SS and the return to the robot base RB according to the activation of the solar panel SS, so that the solar panel SS can automatically be cleaned.

When the movement controller 31 has the function of storing the moving passage to the reception of the inclination start announcing signal, preferably the cleaning is started from the position at which the cleaning is interrupted in the case that the self-propelled cleaning robot 1 returns to the robot base RB before cleaning the whole surface of the solar panel SS.

In the case that the inclination angle of the solar panel SS is adjusted to the angle at which the self-propelled cleaning robot 1 travels easily for the purpose of the cleaning, namely, in the case that a cleaning time period is specially provided, when the movement of the self-propelled cleaning robot 1 from the solar panel SS to the robot base RB is completed, preferably the self-propelled cleaning robot 1 transmits a signal (cleaning completion signal) indicating the completion of the movement to the external controller that controls the activation of the solar panel SS. In this case, after receiving the cleaning completion signal, the external controller starts to adjust the inclination angle of the solar panel SS for the purpose of the power generation. Therefore, the self-propelled cleaning robot 1 can be prevented from dropping from the solar panel SS when the adjustment of the inclination angle of the solar panel SS is started.

In the above example, by way of example, the analyzer 37 determines the current inclination angle of the solar panel SS based on the signal from the inclination sensor 36, and the change in inclination angle of the solar panel SS is understood based on the inclination notification signal from the external controller. Alternatively, the current inclination angle of the solar panel SS may be determined based on the signal from the external controller, and the analyzer 37 may understand the change in inclination angle of the solar panel SS based on the signal from the inclination sensor 36. The analyzer 37 may determine both the current inclination angle and the change in inclination angle based on the signal from the inclination sensor 36 or the signal from the external controller.

A person may start the cleaning with the self-propelled cleaning robot 1 at any period or time, or the cleaning may automatically be started and ended in each constant time period.

When the determination that the power output of the solar panel SS degrades is made (that is, the surface of the solar panel SS gets dirty), the self-propelled cleaning robot 1 may start the cleaning.

There is no particular limitation to a method for detecting the degradation of the power generation output of the solar panel SS. For example, the degradation of the power generation output can be detected by the following method for the solar power generation.

Generation power (1) is calculated by multiplying unique conversion efficiency of the solar cell module used by a radiation amount detected with a pyrheliometer. Generation power (2) is calculated by multiplying a unique temperature coefficient of the solar cell module used by a surface temperature of the solar cell module. The generation power, which is expected when the solar cell module is not dirty, is obtained by performing a calculation of (1)-(2). The generation power obtained by the calculation is compared to the actual generation power. When the actual generation power is lower than a given value, the determination that the surface of the solar cell module gets dirty may be made to start the cleaning with the self-propelled cleaning robot 1.

(The Case that Robot Base RB is not Provided)

In the above example, by way of example, the self-propelled cleaning robot 1 is held by the robot base RB. Instead of providing the robot base RB, the self-propelled cleaning robot 1 may have the function of preventing the drop even if the inclination of the solar panel SS increases largely. That is, the self-propelled cleaning robot 1 may include a fixing unit that fixes the self-propelled cleaning robot 1 to the solar panel SS.

In this case, when the inclination start announcing signal is transmitted to the movement controller 31, the self-propelled cleaning robot 1 stops the travel, and the fixing unit fixes the self-propelled cleaning robot 1 to the solar panel SS.

On the other hand, the self-propelled cleaning robot 1 is released from the solar panel SS when the movement controller 31 receives the return signal, and the self-propelled cleaning robot 1 starts the cleaning when the movement controller 31 receives the cleaning start signal while holding the return signal.

Therefore, the starting and interruption of the cleaning can quickly be switched while the drop of the self-propelled cleaning robot 1 is prevented.

There is no particular limitation to a method in which the fixing unit prevents the drop of the self-propelled cleaning robot 1. For example, the self-propelled cleaning robot 1 may be sucked and fixed to the surface of the solar panel SS using a suction cap, or the self-propelled cleaning robot 1 may be fixed to a member, such as a hook, which engages an end edge of the solar panel SS.

(Arrangement of Self-Propelled Cleaning Robot 1)

The following method is adopted in the case that the self-propelled cleaning robot 1 is arranged on the solar panel SS or the robot base RB of the solar panel SS, or in the case that the self-propelled cleaning robot 1 is replaced. The following method is adopted in the case that the self-propelled cleaning robot 1 is arranged in the structure SP (for example, the structure SP such as the solar panel SS in which the target flat surface SF is located at a level of about 2 m or more from the ground) in which the level of the target flat surface SF increases while the self-propelled cleaning robot 1 performs the cleaning (that is, the inclination angle becomes the angle in the cleanable state), and the structure SP in which the level is partially decreased when the inclination angle increases largely while the self-propelled cleaning robot 1 performs the cleaning.

For example, in the movable solar panel SS, the solar panel SS is arranged at an upper end of a support post such that the inclination angle can be changed. In the solar panel SS, frequently the support post has a height of about 5 m, and the level of the top surface becomes about 5 m from the ground at the cleanable angle. There is the solar panel SS formed into a square shape having one side of about 10 m. In such solar panels SS, the support post is coupled in a central portion on the rear side. Therefore, when the inclination angle of the solar panel SS increases largely, one end edge of the solar panel SS is located near the ground. The following method is adopted in the case that the self-propelled cleaning robot 1 is arranged in the structure SP.

In the case that the target flat surface SF of the structure SP (hereinafter, referred to as the solar panel SS), such as the solar panel SS, becomes the cleanable angle, the level of the target flat surface SF is 3 m or more from the ground. For this reason, a human cannot arrange the self-propelled cleaning robot 1 on the target flat surface SF. Therefore, the inclination angle of the target flat surface SF increases largely in order to decrease the level of the target flat surface SF. That is, the inclination angle increases largely such that the target flat surface SF becomes the state close to the vertical angle. This enables the target flat surface SF to be partially arranged near the ground.

In the case that the self-propelled cleaning robot 1 includes the fixing unit, the self-propelled cleaning robot 1 is brought into contact with the target flat surface SF to activate the fixing unit. The self-propelled cleaning robot 1 can be fixed to the target flat surface SF by the fixing unit. Accordingly, the self-propelled cleaning robot 1 can be arranged on the target flat surface SF, and the self-propelled cleaning robot 1 can clean the target flat surface SF when the target flat surface SF is set to the inclination angle from the state in which the level of the target flat surface SF is decreased close to the vertical angle.

In the case that the robot base RB is provided, the robot base RB is provided at the position close to the ground when the inclination angle of the target flat surface SF increases largely. Therefore, the self-propelled cleaning robot 1 can be arranged in the robot base RB when the inclination angle of the target flat surface SF increases largely. Accordingly, the self-propelled cleaning robot 1 can clean the target flat surface SF when the target flat surface SF is set to the inclination angle from the state in which the robot base RB is arranged in the target flat surface SF.

(Other Examples of Robot Main Body 2)

As illustrated in FIG. 7, the self-propelled cleaning robot 1 is suitable for the case that the surfaces of the constructions are sequentially cleaned in the structure SP constructed with the plural constructions like the solar cell array constructed with the plural solar cell modules.

On the other hand, although the self-propelled cleaning robot 1 can simultaneously clean the surfaces of the plural constructions constituting the structure SP like the solar cell array constructed with the plural solar cell modules, the cleaning can more easily be performed when the self-propelled cleaning robot 1 has the following configuration.

There is no particular limitation to the configuration of the structure SP cleaned by self-propelled cleaning robots 1B to 1C. However, the self-propelled cleaning robots 1B to 1C is suitable for the structure SP, such as the solar cell array, which is formed by arraying plural constructions such as solar cell modules into a lattice shape, and the structure SP that is formed so as to be horizontally lengthened compared with a vertical direction. Hereinafter, the vertical direction (that is, the direction in which the structure SP is shorter in length) of the structure SP is referred to as a short axis direction of the structure SP.

Because the self-propelled cleaning robots 1B to 1C are substantially identical to the self-propelled cleaning robot 1 in the basic structure, only a component having a configuration different from the self-propelled cleaning robot 1 will be described below.

(Self-Propelled Cleaning Robot 1B)

Figure 11:
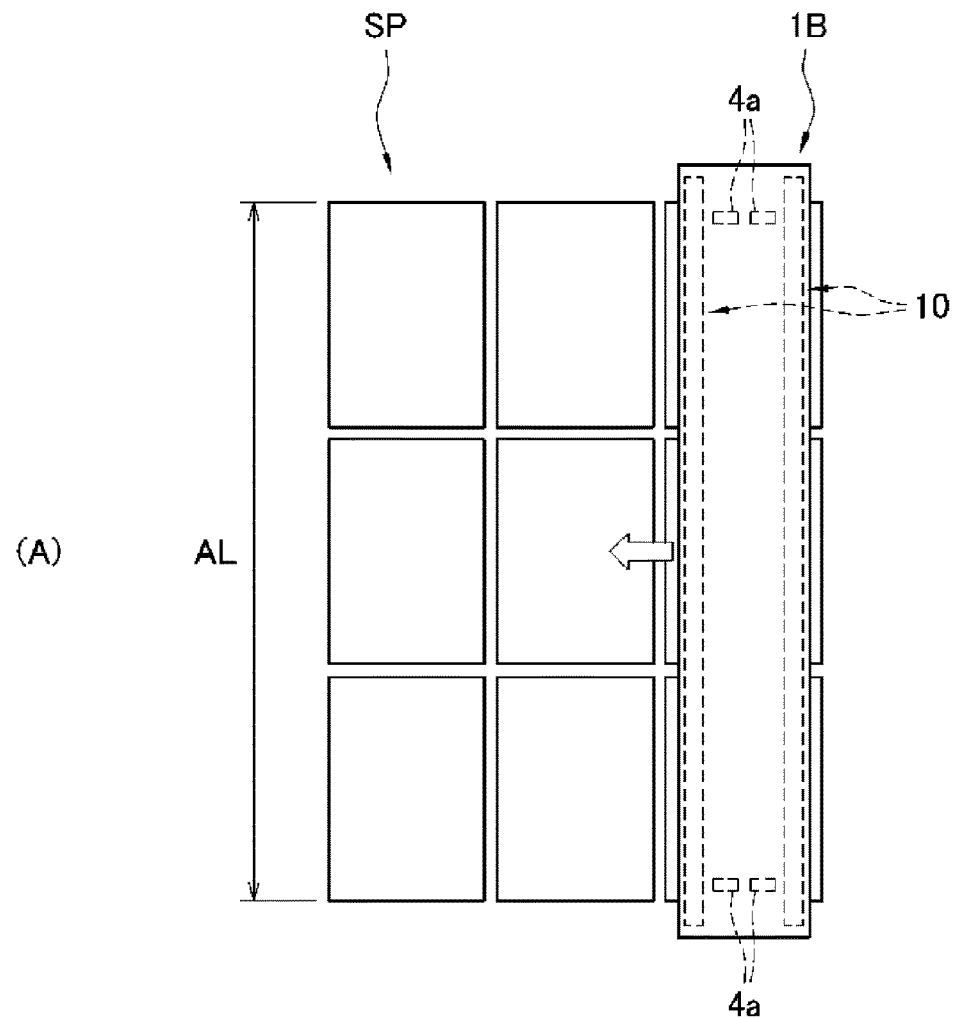
FIG. 11 is a schematic explanatory view illustrating an self-propelled cleaning robot 1B according to another embodiment.
Figure 11:
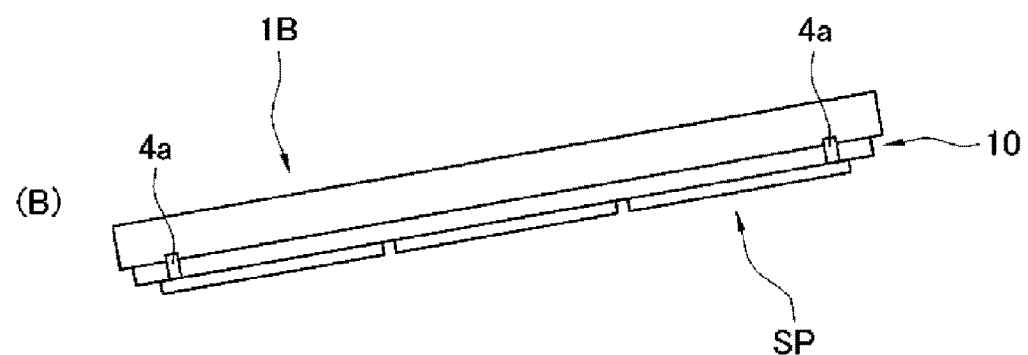

As illustrated in FIG. 11, a width (that is, an axial direction of the brush 12 of the cleaning unit 10) of the self-propelled cleaning robot 1B is lengthened compared with the self-propelled cleaning robot 1B. Specifically, in the self-propelled cleaning robot 1B, a length in the axial direction of the brush 12 is longer than a length AL (hereinafter, simply referred to as a length AL of the structure SP) in the short axis direction of the structure SP. That is, the length in the axial direction of the brush 12 is set to a length to a degree that the brush unit 12b of the brush 12 is in contact with all the plural constructions of the structure SP.

For the self-propelled cleaning robot 1B having the above configuration, the self-propelled cleaning robot 1 is placed on the target flat surface SF, and the axial direction of the brush 12 is aligned with the short axis direction of the structure SP. At this point, when the driving wheel 4a of the moving means 4 is activated, the plural constructions can simultaneously be cleaned because the self-propelled cleaning robot 1B can be moved in a width direction (a horizontal direction in FIG. 8) of the structure SP.

(Self-Propelled Cleaning Robot 1C)

Figure 12:
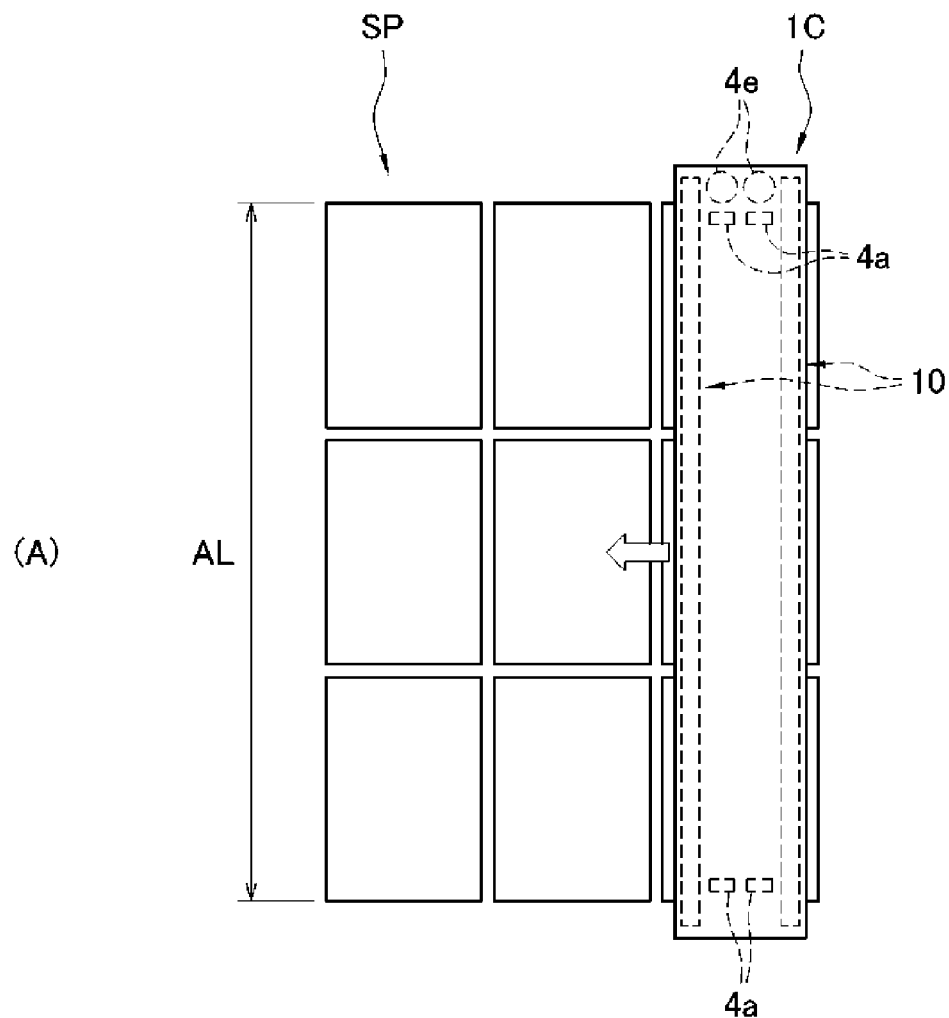
FIG. 12 is a schematic explanatory view illustrating an self-propelled cleaning robot 1C according to another embodiment.
Figure 12:
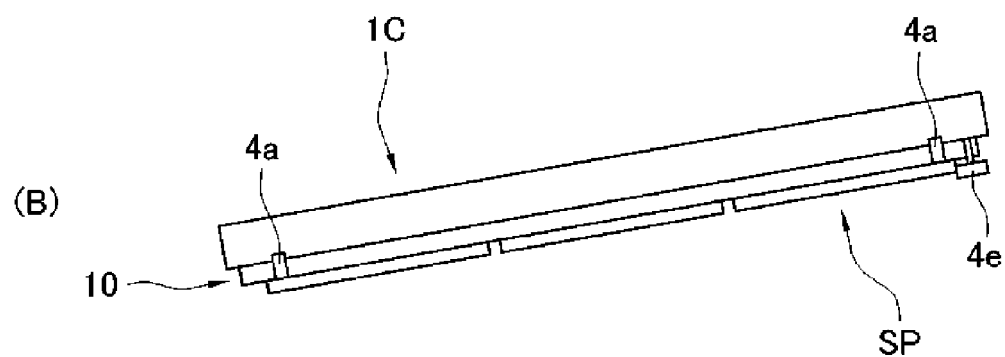

In the self-propelled cleaning robot 1C in FIG. 12, an edge roller 4e is provided in the self-propelled cleaning robot 1B. Other configurations of the self-propelled cleaning robot 1C are substantially similar to those of the self-propelled cleaning robot 1B.

The edge roller 4e is provided at a position, where the self-propelled cleaning robot 1C is in contact with an upper end edge of the construction of the structure SP when placed on the structure SP. That is, the self-propelled cleaning robot 1C is hooked in the structure SP by the edge roller 4e. Therefore, the self-propelled cleaning robot 1C can stably be arranged on the target flat surface SF of the structure SP compared with the self-propelled cleaning robot 1B. In other words, the self-propelled cleaning robot 1C can be prevented from dropping from the target flat surface SF of the structure SP compared with the self-propelled cleaning robot 1B.

Additionally, the edge roller 4e is provided such that a rotation shaft of the edge roller 4e is parallel to the target flat surface SF, and can roll on the upper end edge of the construction of the structure SP when the self-propelled cleaning robot 1C moves in the width direction of the structure SP. Therefore, even if the edge roller 4e is provided, the self-propelled cleaning robot 1C can move smoothly on the target flat surface SF of the structure SP.

INDUSTRIAL APPLICABILITY

The self-propelled cleaning robot of the present invention is suitable for the robot that cleans the solar cell array of the large-scale solar power generation facility, the condensing mirror of the solar thermal power generation facility, the light receiving surface in the solar water heater, and the like.

DESCRIPTION OF REFERENCE SIGNS

1 self-propelled cleaning robot
2 robot main body
10 cleaning unit
12 brush
12a shaft unit
12b brush unit
30 controller
31 movement controller
32 brush controller
35 attitude controller
36 inclination sensor
37 analyzer
SF target flat surface

The invention claimed is:

1. A self-propelled cleaning robot that self-travels on a structure to clean a flat surface of the structure, the structure being installed in an outdoor location, the self-propelled cleaning robot, comprising:
   a robot main body in which a self-propelled moving means is provided;
   a cleaning unit that is provided in a front portion and/or a rear portion of the robot main body; and
   a controller that controls activation of the moving means in order to move the cleaning robot in a moving direction,
   wherein the controller includes an attitude controller that detects an attitude of the robot main body,
   the attitude controller includes a floating detection sensor that detects floating in one of the front portion and the rear portion of the robot main body, and
   when the floating detection sensor detects the floating in one of the front portion and the rear portion of the robot main body, recognizing an unsatisfied cleaning portion where the floating is detected, the controller controls the activation of the moving means in order to move the cleaning robot in a direction, which is 180 degrees opposite to the moving direction, such that the cleaning unit passes through the unsatisfied cleaning portion after the floating is eliminated.

2. The self-propelled cleaning robot according to claim 1, wherein
   the floating detection sensor is an inclination sensor that detects an inclination of the robot main body.

3. The self-propelled cleaning robot according to claim 1, wherein
the cleaning unit includes a brush that is rotated by a motor, and
the floating detection sensor is a motor monitoring sensor that detects an activation state of the motor.

4. The self-propelled cleaning robot according to claim 1, wherein
the flat surface of the structure is installed in an inclined manner with respect to a horizontal direction, the flat surface having an inclination angle,
the floating detection sensor is an inclination sensor that detects the inclination angle of the flat surface of the structure,
the controller activates the moving means such that the moving means travels on the flat surface when the inclination angle of the flat surface of the structure is less than a predetermined angle, and
the controller activates the moving means such that the moving means stops the travel on the flat surface when the inclination angle of the flat surface of the structure is greater than or equal to the predetermined angle.

5. The self-propelled cleaning robot according to claim 4, wherein
the structure further includes a base that accommodates the self-propelled cleaning robot therein,
the controller activates the moving means such that the moving means moves from the flat surface to the base when the inclination angle of the flat surface of the structure is greater than or equal to the predetermined angle, and the controller activates the moving means such that the moving means moves from the base to travel on the flat surface when the inclination angle of the flat surface of the structure is less than the predetermined angle.

6. The self-propelled cleaning robot according to claim 4, wherein
the robot main body includes a fixing unit that fixes the robot main body to the structure, and
the controller stops the travel on the flat surface to fix to the robot main body to the structure using the fixing unit when detecting that the inclination angle of the flat surface of the structure is greater than or equal to the predetermined angle, and the controller releases the robot main body fixed to the structure by the fixing unit to cause the robot main body to travel on the flat surface when detecting that the inclination angle of the flat surface of the structure is less than the predetermined angle.

7. The self-propelled cleaning robot according to claim 1, wherein
the structure is a solar cell array or a condensing mirror, the solar cell array or the condensing mirror being formed by arraying a plurality of solar cell modules or mirrors.

8. The self-propelled cleaning robot according to claim 1, further comprising:
another cleaning unit that is provided in another portion from the one of the front portion and the rear portion of the robot main body where the cleaning unit is provided, wherein
the controller controls the another cleaning unit in the same fashion as the cleaning unit is controlled.

9. The self-propelled cleaning robot according to claim 8, wherein
the structure is a solar cell array or a condensing mirror, the solar cell array or the condensing mirror being formed by arraying a plurality of solar cell modules or mirrors.

10. The self-propelled cleaning robot according to claim 1, wherein
the floating detection sensor is an inclination sensor that detects an inclination angle of the robot main body,
before staring moving on the flat surface, the controller detects the inclination angle of the robot main body with the inclination sensor, the inclination angle being defined as an initial reference angle and stored in the controller,
while traveling on the flat surface, the controller monitors the inclination angle of the robot main body, the inclination angle monitored being defined as a working angle stored in the controller,
the controller determines whether or not the robot main body is floating above the flat surface of the structure based on a comparison between the initial reference angle and the working angle, and storing an activation record of the moving means while a floating of the robot main body is detected.

11. The self-propelled cleaning robot according to claim 10, wherein
when the floating is no longer determined, the controller causes the moving means to move in a direction that is 180 degrees opposite to the moving direction.

12. The self-propelled cleaning robot according to claim 11, wherein
when the floating of the robot main body is determined, the controller causes
the cleaning unit to keep running and
the moving means to keep traveling in the moving direction until the working angle becomes equal to or less than the initial reference angle.

13. The self-propelled cleaning robot according to claim 12, wherein
the activation record is composed mainly with a period that is determined from a timing when the floating occurs to another timing when the floating dissolves.

14. The self-propelled cleaning robot according to claim 12, wherein
the activation record is composed mainly with a moving path that is determined from a spot where the floating occurs to another spot where the floating dissolves.

15. The self-propelled cleaning robot according to claim 12, wherein
the activation record is composed mainly with a moving linear distance that is determined from a spot where the floating occurs to another spot where the floating dissolves.

16. The self-propelled cleaning robot according to claim 10, wherein
the controller determines the floating of the robot main body when an angle difference between the initial reference angle and the working angle is at least 1 degree.

17. The self-propelled cleaning robot according to claim 16, wherein
when the floating of the robot main body is no longer determined, the controller
determines an unsatisfied cleaning portion where the floating was determined, and
causes the cleaning unit to pass through the unsatisfied cleaning portion by referring to the activation record stored in the controller.

18. A self-propelled cleaning robot that self-travels on a structure to clean a flat surface of the structure, the structure being installed in an outdoor location, the self-propelled cleaning robot, comprising:

a robot main body in which a self-propelled moving means is provided;

a cleaning unit that is provided in either a front portion or a rear portion of the robot main body; and a controller that controls activation of the moving means, wherein the controller includes an attitude controller that detects an attitude of the robot main body, the attitude controller includes a floating detection sensor that detects floating in one of the front portion and the rear portion of the robot main body where the cleaning unit is disposed, and while the floating detection sensor detects the floating in the one of the front portion and the rear portion of the robot main body, the controller continues to activate the moving means to move in a moving direction, recognizing an unsatisfied cleaning portion where the cleaning unit does not contact to the flat surface of the structure, next the controller
  activates the moving means to move in a rearward direction, which is opposite to the moving direction, when the floating is no longer detected and
  keeps the moving means to move in the rearward direction until the cleaning unit completes to pass through the unsatisfied cleaning portion.

19. The self-propelled cleaning robot according to claim 18, wherein the floating detection sensor is an inclination sensor that detects an inclination angle of the robot main body, before staring moving on the flat surface, the controller detects the inclination angle of the robot main body, the inclination angle being defined as an initial reference angle and stored in the controller, while traveling on the flat surface, the controller monitors the inclination angle of the robot main body, the inclination angle monitored being defined as a working angle stored in the controller, the controller determines whether or not the floating is detected based on a comparison between the initial reference angle and the working angle, and storing an activation record of the moving means while the floating of the robot main body is detected.

\* \* \* \* \*